United States Patent
Havre et al.

(10) Patent No.: US 12,529,452 B2
(45) Date of Patent: Jan. 20, 2026

(54) MULTIPHASE FLOW INSTABILITY CONTROL

(71) Applicant: Schlumberger Technology Corporation, Sugar Land, TX (US)

(72) Inventors: Kjetil Havre, Lysaker (NO); Christian Trudvang, Lysaker (NO); Gustav Kjorrefjord, Lysaker (NO)

(73) Assignee: Schlumberger Technology Corporation, Sugar Land, TX (US)

(*) Notice: Subject to any disclaimer, the term of this patent is extended or adjusted under 35 U.S.C. 154(b) by 359 days.

(21) Appl. No.: 18/337,169

(22) Filed: Jun. 19, 2023

(65) Prior Publication Data

US 2023/0408043 A1 Dec. 21, 2023

Related U.S. Application Data

(60) Provisional application No. 63/366,640, filed on Jun. 19, 2022.

(51) Int. Cl.
*F17D 3/12* (2006.01)
*F17D 1/00* (2006.01)
*F17D 1/20* (2006.01)

(52) U.S. Cl.
CPC ............ *F17D 3/12* (2013.01); *F17D 1/005* (2013.01); *F17D 1/20* (2013.01)

(58) Field of Classification Search
USPC ........................................................ 700/282
See application file for complete search history.

(56) References Cited

U.S. PATENT DOCUMENTS

| 6,595,294 | B1 | 7/2003 | Dalsmo et al. | |
|---|---|---|---|---|
| 2006/0041392 | A1 | 2/2006 | Korske | |
| 2008/0041586 | A1* | 2/2008 | Eken | E21B 43/121 |
| | | | | 166/54.1 |
| 2016/0245073 | A1 | 8/2016 | Hansen et al. | |
| 2019/0093455 | A1 | 3/2019 | Xiao et al. | |
| 2019/0169982 | A1* | 6/2019 | Hauge | E21B 47/10 |
| 2020/0096452 | A1* | 3/2020 | Song | G01N 21/75 |
| 2020/0224519 | A1 | 7/2020 | Kleemeier et al. | |

FOREIGN PATENT DOCUMENTS

CA     3206453 A1 *   8/2022   ............. E21B 23/03

OTHER PUBLICATIONS

CA_2858100_A1 (Year: 2013).*
CA_2445415_C (Year: 2011).*
BR_102013030618_A2 (Year: 2017).*
Search Report and Written Opinion of International Patent Application No. PCT/US2023/068662 dated Oct. 6, 2023, 9 pages.

* cited by examiner

Primary Examiner — Hien D Khuu
(74) Attorney, Agent, or Firm — Jeffrey D. Frantz

(57) ABSTRACT

A method can include detecting instability of multiphase fluid flow in a multiphase fluid production system using sensor measurements from the multiphase fluid production system; and, responsive to the detection of instability, increasing gas injection into the multiphase fluid production system until a variation metric of the sensor measurements decreases to a level indicative of stable multiphase fluid flow in the multiphase fluid production system.

20 Claims, 16 Drawing Sheets

Method 1400

MULTIPHASE FLOW INSTABILITY CONTROL

RELATED APPLICATION

This application claims priority to and the benefit of a US Provisional Application having Ser. No. 63/366,640, filed 19 Jun. 2022, which is incorporated by reference herein in its entirety.

BACKGROUND

Production systems can provide for transportation of fluids from well locations to processing facilities, from processing facilities to well locations, etc. Such fluid may be single or multiphase and include one or more hydrocarbon fluids (e.g., oil, natural gas, etc.) and may include one or more other fluids (e.g., water, etc.). As an example, a system may include a substantial number of flowlines and pieces of production equipment, for example, interconnected at junctions to form a network, which may be referred to as a fluid production network.

SUMMARY

A method can include detecting instability of multiphase fluid flow in a multiphase fluid production system using sensor measurements from the multiphase fluid production system; and, responsive to the detection of instability, increasing gas injection into the multiphase fluid production system until a variation metric of the sensor measurements decreases to a level indicative of stable multiphase fluid flow in the multiphase fluid production system. A system can include a processor; memory accessible by the processor; and processor-executable instructions stored in the memory where the instructions include instructions to instruct the system to: detect instability of multiphase fluid flow in a multiphase fluid production system using sensor measurements from the multiphase fluid production system; and responsive to the detection of instability, increase gas injection into the multiphase fluid production system until a variation metric of the sensor measurements decreases to a level indicative of stable multiphase fluid flow in the multiphase fluid production system. One or more computer-readable storage media can include computer-executable instructions executable by a computer, the instructions including instructions to: detect instability of multiphase fluid flow in a multiphase fluid production system using sensor measurements from the multiphase fluid production system; and, responsive to the detection of instability, increase gas injection into the multiphase fluid production system until a variation metric of the sensor measurements decreases to a level indicative of stable multiphase fluid flow in the multiphase fluid production system.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
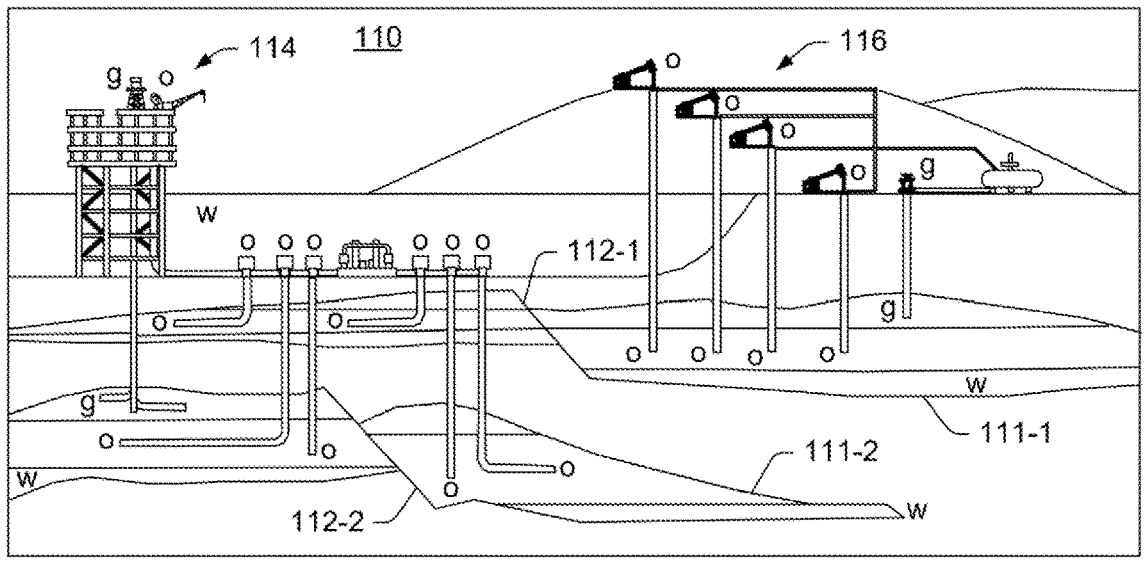
FIG. 1 illustrates an example field system that includes various components, an example of a method and an example of a device or system.
Figure 1:
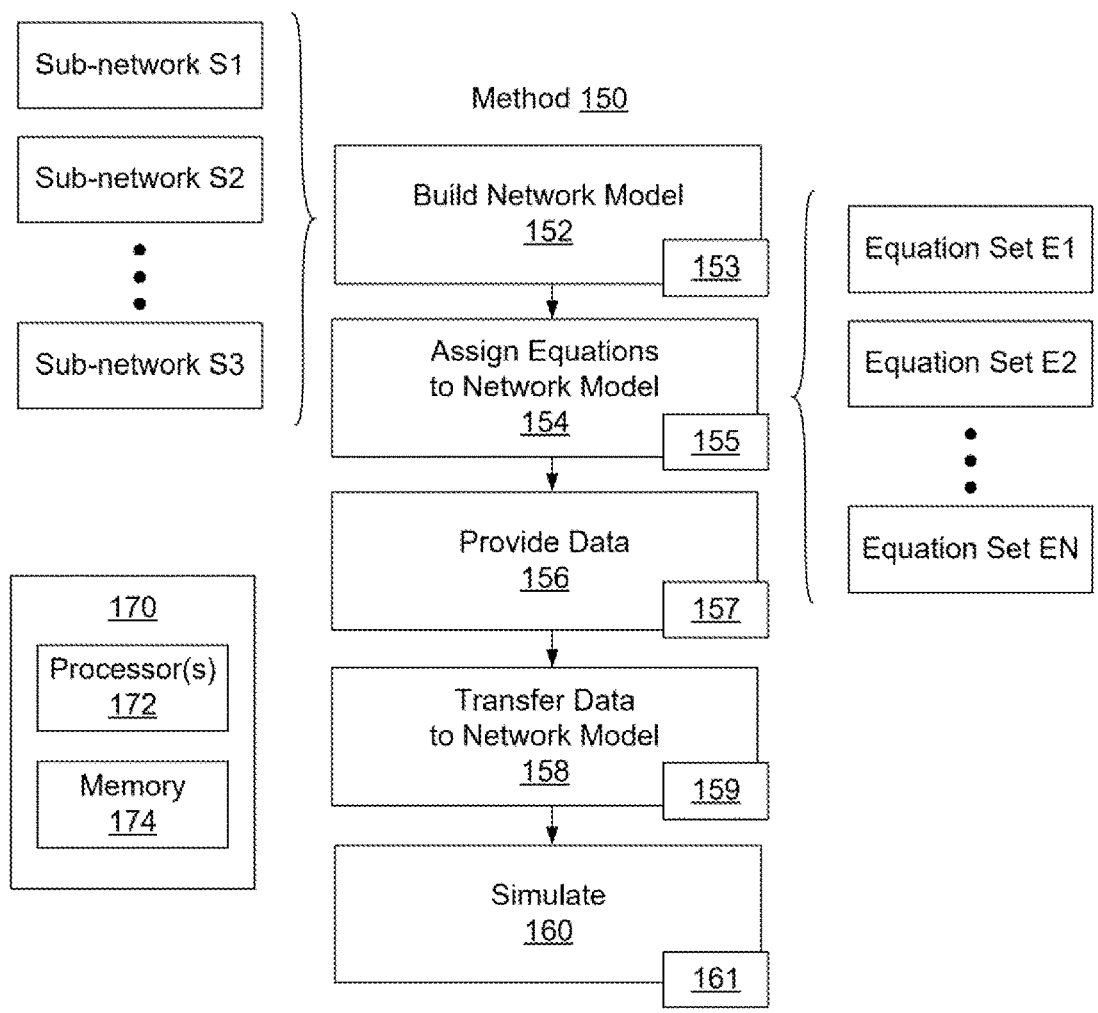

FIG. 1 shows an example of a geologic environment 110 that includes reservoirs 111-1 and 111-2, which may be faulted by faults 112-1 and 112-2, an example of a method 150 and an example of a device or system 170. FIG. 1 also shows some examples of offshore equipment 114 for oil and gas operations related to the reservoir 111-2 and onshore equipment 116 for oil and gas operations related to the reservoir 111-1.

As an example, a model may be made that models a geologic environment in combination with equipment, wells, etc. For example, a model may be a flow simulation model for use by a simulator to simulate flow in an oil, gas or oil and gas production system. Such a flow simulation model may include equations, for example, to model multiphase flow from a reservoir to a wellhead, from a wellhead to a reservoir, etc. A flow simulation model may also include equations that account for flowline and surface facility performance, for example, to perform a comprehensive production system analysis.

As an example, a flow simulation model may be a network model that includes various sub-networks specified using nodes, segments, branches, etc. As an example, a flow simulation model may be specified in a manner that provides for modeling of branched segments, multilateral segments, complex completions, intelligent downhole controls, etc. As an example, one or more portions of a production network (e.g., optionally sub-networks, etc.) or a group of signal components and/or controllers may be modeled as sub-models.

As an example, a system may provide for transportation of oil and gas fluids from well locations to processing facilities and may represent a substantial investment in infrastructure with both economic and environmental impact. Simulation of such a system, which may include hundreds or thousands of flow lines and production equipment interconnected at junctions to form a network, can involve multiphase flow science and, for example, use of engineering and mathematical techniques for large systems of equations.

As an example, a flow simulation model may include equations for performing nodal analysis, pressure-volume-temperature (PVT) analysis, gas lift analysis, erosion analysis, corrosion analysis, production analysis, injection analysis, etc. In such an example, one or more analyses may be based, in part, on a simulation of flow in a modeled network.

As to nodal analysis, it may provide for evaluation of well performance, for making decisions as to completions, etc. A nodal analysis may provide for an understanding of behavior of a system and optionally sensitivity of a system (e.g., production, injection, production and injection). For example, a system variable may be selected for investigation and a sensitivity analysis performed. Such an analysis may include plotting inflow and outflow of fluid at a nodal point or nodal points in the system, which may indicate where certain opportunities exist (e.g., for injection, for production, etc.).

A modeling framework may include instructions (e.g., processor-executable instructions) to facilitate generation of a flow simulation model. For example, instructions may provide for modeling completions for vertical wells, completions for horizontal wells, completions for fractured wells, etc. A modeling framework may include instructions for particular types of equations, for example, black-oil equations, equation-of-state (EOS) equations, etc. A modeling framework may include instructions for artificial lift, for example, to model fluid injection, fluid pumping, etc. As an example, consider a set of instructions (e.g., a component) that includes features for modeling one or more electric submersible pumps (ESPs) (e.g., based in part on pump performance curves, motors, cables, etc.).

As an example, an analysis using a flow simulation model may be a network analysis to: identify production bottlenecks and constraints; assess benefits of new wells, additional pipelines, compression systems, etc.; calculate deliverability from field gathering systems; predict pressure and temperature profiles through flow paths; or plan full-field development.

As an example, a flow simulation model may provide for analyses with respect to future times, for example, to allow for optimization of production equipment, injection equipment, etc. As an example, consider an optimal time-based and conditional-event logic representation for daily field development operations that can be used to evaluate drilling of new developmental wells, installing additional processing facilities over time, choke-adjusted wells to meet production and operating limits, shutting in of depleting wells as reservoir conditions decline, etc.

As to equations, sets of conservation equations for mass momentum and energy describing single, two or three phase flow (e.g., according to one or more of a LEDAFLOW (Kongsberg Oil & Gas Technologies AS, Sandvika, Norway), OLGA model (SLB, Houston, Texas), TUFFP unified mechanistic models (Tulsa University Fluid Flow Projects, Tulsa, Oklahoma), etc.).

As to the method 150 of FIG. 1, it can include a build block 152 for building a network model that represents a production system for fluid; an assignment block 154 for assigning equations to sub-networks in the network model (e.g., where at least one of the sub-networks is optionally assigned equations formulated for solving for pressure and momentum implicitly and simultaneously, conservation mass and energy/temperature in separate stages), a provision block 156 for providing data; a transfer block 158 for transferring the data to the network model; and a simulation block 160 for simulating physical phenomena associated with the production system using the network model to provide simulation results.

The method 150 is shown in FIG. 1 in association with various computer-readable media (CRM) blocks 153, 155, 157, 159 and 161. Such blocks generally include instructions suitable for execution by one or more processors (or processing cores) 172 to instruct the computing device or system 170 to perform one or more actions. While various blocks are shown, a single medium may be configured with instructions to allow for, at least in part, performance of various actions of the method 150. As an example, a computer-readable medium (CRM) may be a computer-readable storage medium that is not a carrier wave, for example, such as a memory device 174 of the computing device or system 170, where the memory device 174 includes memory.

A production system can include equipment, for example, where a piece of equipment of the production system may be represented in a sub-network of a network model (e.g., optionally as a sub-model or sub-models, etc.) and, for example, assigned equations formulated to represent the piece of equipment. As an example, a piece of equipment may include an electric motor operatively coupled to a mechanism to move fluid (e.g., a pump, compressor, etc.). As an example, a piece of equipment may include a heater coupled to a power source, a fuel source, etc. (e.g., consider a steam generator). As an example, a piece of equipment may include a conduit for delivery of fluid where the fluid may be for delivery of heat energy (e.g., consider a steam injector). As an example, a piece of equipment may include a conduit for delivery of a substance (e.g., a chemical, a proppant, etc.).

As an example, a sub-network may be assigned equations formulated to represent fluid at or near a critical point, to represent heavy oil, to represent steam, to represent water or one or more other fluids (e.g., optionally subject to certain physical phenomena such as pressure, temperature, etc.).

As an example, a system can include a processor; a memory device having memory accessible by the processor; and processor-executable instructions stored in the memory of the memory device, the instructions executable to instruct the system to: build a network model that represents a production system for fluid, assign equations to sub-networks in the network model, provide data, transfer the data to the network model, and simulate physical phenomena associated with the production system using the network model to provide simulation results.

As an example, a system can include a sub-network assigned equations formulated for steam associated with equipment for an enhanced oil recovery (EOR) process (e.g., steam-assisted gravity drainage (SAGD) and/or other EOR process).

As an example, a system can include a sub-network that represents a piece of equipment of a production system by assigning that sub-network equations formulated to represent the piece of equipment. In such an example, the piece of equipment may include an electric motor operatively coupled to a mechanism to move fluid (e.g., a compressor, a pump, etc.).

As an example, one or more computer-readable media can include computer-executable instructions executable by a computer to instruct the computer to: receive simulation results for physical phenomena associated with a production system modeled by a network model; and analyze the simulation results.

Figure 2:
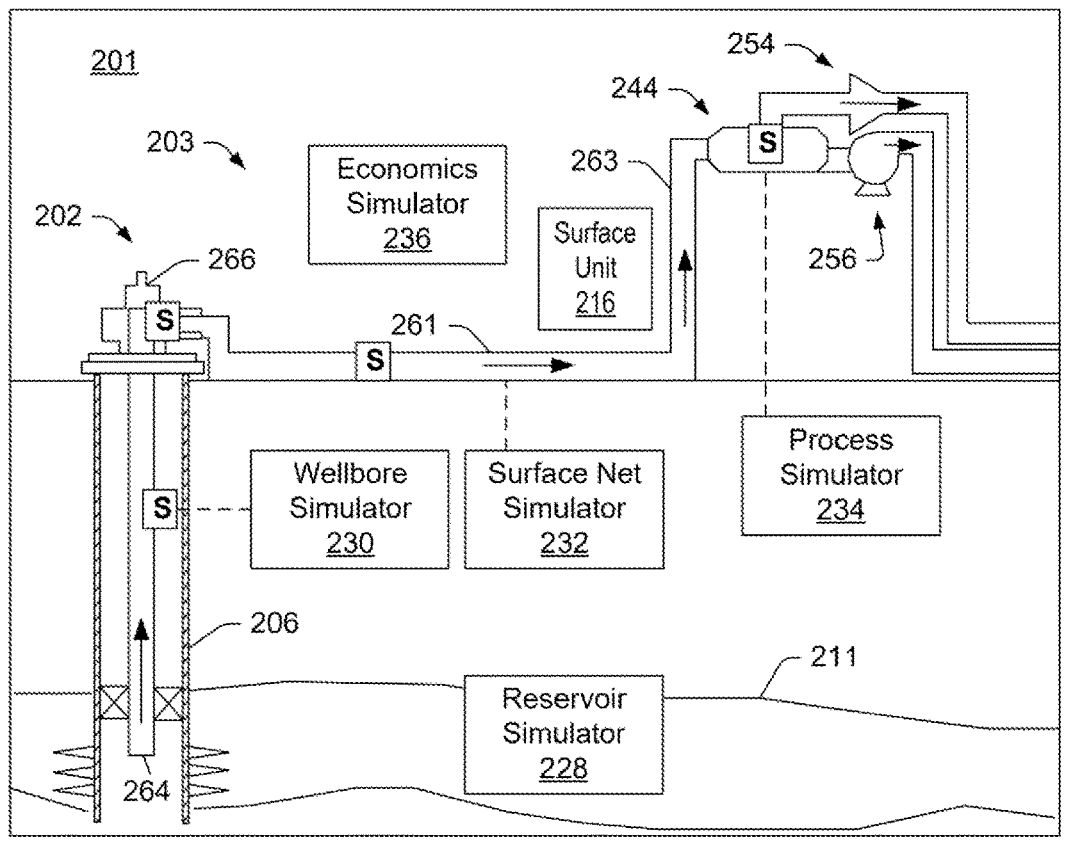
FIG. 2 illustrates an example of a system and an example of a ternary diagram with an example of an associated table of fluid properties.
Figure 2:
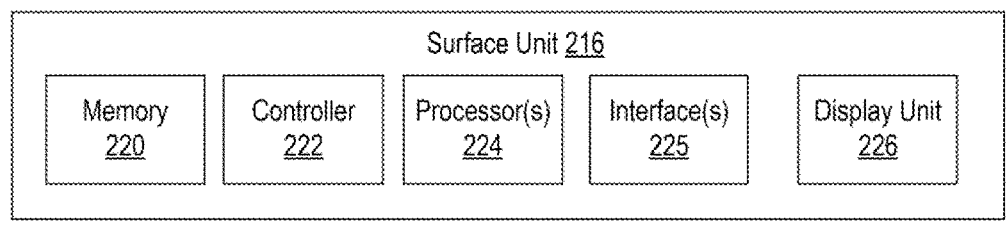
Figure 2:
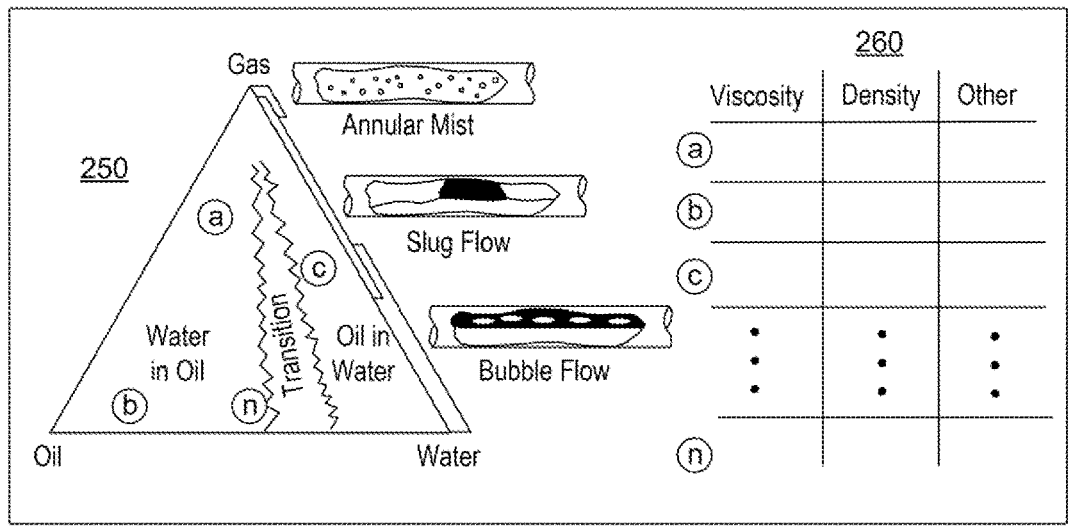

FIG. 2 shows an example of a schematic view of a portion of a geologic environment 201 that includes equipment and an example of a ternary diagram 250 with an example of a table 260 of associated fluid properties. As shown in FIG. 2, the environment 201 includes a wellsite 202, a network 203 and various examples of surface process equipment such as, for example, a separator 244, a compressor 254 and a pump 256. The wellsite 202 includes a wellbore 206 extending into earth as completed and prepared for production of fluid from a reservoir 211.

In the example of FIG. 2, wellbore production equipment 264 extends from a wellhead 266 of the wellsite 202 and to the reservoir 211 to draw fluid to the surface. As shown, the wellsite 202 is operatively connected to the network 203 via a transport line 261 (e.g., a pipeline) that can include a riser 263, which may include an S-shaped portion that may form a type of trap. As indicated by various arrows, fluid can flow from the reservoir 211, through the wellbore 206 and onto the network 203 and to a portion thereof 244. Fluid can then flow from the portion of the network 244, for example, to one or more fluid processing facilities.

In the example of FIG. 2, sensors (S) are located, for example, to monitor various parameters during operations. The sensors (S) may measure, for example, pressure, temperature, flowrate, composition, and other parameters of the reservoir, wellbore, gathering network, process facilities and/or other portions of an operation. As an example, the sensors (S) may be operatively connected to a surface unit 216 (e.g., to instruct the sensors to acquire data, to collect data from the sensors, etc.).

In the example of FIG. 2, the surface unit 216 can include various components, such as, for example, a memory device 220, a controller 222, one or more processors 224, one or more interfaces 225 and display unit 226 (e.g., for managing data, visualizing results of an analysis, etc.). As an example, data may be collected in the memory device 220 and processed by at least one of the one or more processor(s) 224 (e.g., for analysis, etc.). As an example, data may be collected from the sensors (S) and/or by one or more other sources. For example, data may be supplemented by historical data collected from other operations, user inputs, etc. As an example, analyzed data may be used in a decision-making process.

In the example of FIG. 2, a transceiver may be provided to allow communications between the surface unit 216 (e.g., via one or more of the interfaces 225) and one or more pieces of equipment in the environment 201 (e.g., one or more equipment interfaces, which may be wired and/or wireless). For example, the controller 222 may be used to actuate mechanisms in the environment 201 via the transceiver, optionally based on one or more decisions of a decision-making process. In such a manner, equipment in the environment 201 may be selectively adjusted based at least in part on collected data. Such adjustments may be made, for example, automatically based on computer protocol, manually by an operator or both. As an example, one or more well plans may be adjusted (e.g., to select optimum operating conditions, to avoid problems, etc.). In the example of FIG. 2, a network may be established that is a device network for purposes of transmission and receipt of information (e.g., via network interfaces).

To facilitate data analyses, one or more simulators may be implemented (e.g., optionally via the surface unit 216 or other unit, system, etc.). As an example, data fed into one or more simulators may be historical data, real time data or combinations thereof. As an example, simulation through one or more simulators may be repeated or adjusted based on the data received.

In the example of FIG. 2, simulators can include a reservoir simulator 228, a wellbore simulator 230, and a surface network simulator 232, a process simulator 234 and an economics simulator 236. As an example, the reservoir simulator 228 may be configured to solve for hydrocarbon flow rate (e.g., and optionally one or more pressures) through a reservoir and into one or more wellbores. As an example, the wellbore simulator 230 and surface network simulator 232 may be configured to solve for hydrocarbon flow rate (e.g., and optionally one or more pressures) through a wellbore and a surface gathering network of pipelines. As to the process simulator 234, it may be configured to model a processing plant where fluid containing hydrocarbons is separated into its constituent components (e.g., methane, ethane, propane, etc.), for example, and prepared for further distribution (e.g., transport via road, rail, pipe, etc.) and optionally sale. As an example, the economics simulator 236 may be configured to model costs associated with at least part of an operation. For example, consider MERAK framework (SLB, Houston, Texas), which may provide for economic analyses.

In FIG. 2, the ternary diagram 250 includes vertices that represent single-phase gas, oil and water, while the sides represent two phase mixtures (e.g., gas-oil, oil-water and gas-water) and points within the triangle represents a three-phase mixture. The transition region indicates where the liquid fraction changes from water in oil to oil in water and vice versa (e.g., consider emulsions).

The ternary diagram 250 of FIG. 2 also indicates some examples of ranges of multiphase flow regimes, which may be affected by one or more factors such as, for example, temperature, pressure, viscosity, density, flowline orientation, etc. The example flow regimes include annular mist, slug flow and bubble flow; noting that other types of may occur (e.g., stratified, churn, disperse, etc.). Annular mist flow may be characterized by, for example, a layer of liquid on the wall of a pipe and droplets of liquid in a middle gas zone (e.g., mist). Slug flow may be characterized by, for example, a continuous liquid phase and a discontinuous liquid phase that is discontinuous due to separation by pockets of gas. Bubble flow may be characterized by, for example, two continuous liquid phases where at least one of the continuous liquid phases includes gas bubbles. The illustrative graphics of flow regimes in FIG. 2 correspond to flows in approximately horizontal conduits; noting that a conduit may be disposed at an angle other than horizontal and that various factors that can influence flow may depend on angle of a conduit. For example, the angle of a conduit with respect to gravity can have an influence on how fluid flows in the conduit.

The table 260 of FIG. 2 shows viscosity and density as fluid properties. As to one or more other properties, consider, for example, surface tension. As indicated, the table 260 can include information for points specified with respect to the ternary diagram 250. As an example, factors such as pressure, volume and temperature may be considered, for example, as to values of fluid properties, phases, flow regimes, etc.

As an example, information as to flow of fluid may be illustrated as a flow regime map that identifies flow patterns occurring in various parts of a parameter space defined by component flow rates. For example, consider flow rates such as volume fluxes, mass fluxes, momentum fluxes, or one or more other quantities. Boundaries between various flow patterns in a flow regime map may occur where a regime becomes unstable and where growth of such instability causes transition to another flow pattern. As in laminar-to-turbulent transition in single phase flow, multiphase transitions may be rather unpredictable as they may depend on otherwise minor features of the flow, such as the roughness of the walls or the entrainment and entrance conditions. Thus, as indicated in the ternary diagram 250, flow pattern boundaries may lack distinctiveness and exhibit transition zones.

As to properties, where fluid is single phase (e.g., water, oil or gas), a single value of viscosity may suffice for given conditions. However, where fluid is multiphase, two or more concurrent phases may occupy a flow space within a conduit (e.g., a pipe). In such an example, a single value of viscosity (e.g., or density) may not properly characterize the fluid in that flow space. Accordingly, as an example, a value or values of mixture viscosities may be used, for example, where a mixture value is a function of phase fraction(s) for fluid in a multiphase flow space.

As to surface tension (e.g., a), it may be defined for gas and liquid, for example, where the liquid may be oil or water. Where two-phase liquid-liquid flow exists (e.g., water and oil), then a may reflect the interfacial tension between oil and water (see, e.g., the slug flow regime and the bubble flow regime).

Figure 3:
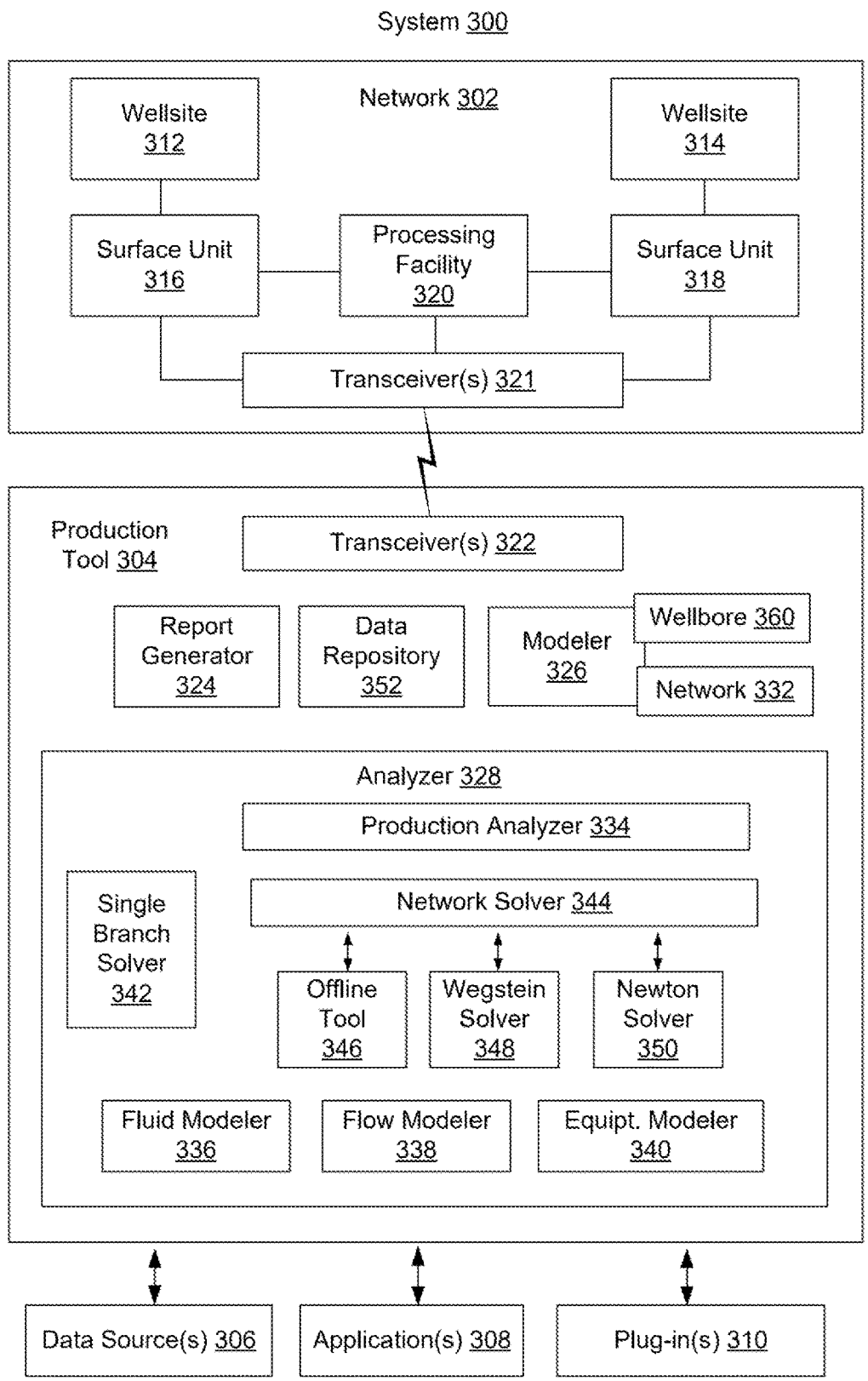
FIG. 3 illustrates an example of a system.

FIG. 3 shows an example of a schematic diagram of a production system 300 for performing oilfield production operations. As shown in the example of FIG. 3, the production system 300 can include an oilfield network 302, an oilfield production tool 304, one or more data sources 306, one or more oilfield application(s) 308, and one or more plug-in(s) 310. As an example, the oilfield network 302 can be an interconnection of pipes (e.g., conduits) that connects wellsites (e.g., a wellsite 1 312, a wellsite n 314, etc.) to a processing facility 320. A pipe in the oilfield network 302 may be connected to a processing facility (e.g., a processing facility 320), a wellsite (e.g., the wellsite 1 312, the wellsite n 314, etc.), and/or a junction in which pipes are connected. As an example, flow rate of fluid and/or gas into pipes may be adjustable; thus, certain pipes in the oilfield network 302 may be choked or closed so as to not allow fluid and/or gas through the pipe. A pipe may be considered open (e.g., optionally choked) when the pipe allows for flow of fluid and/or gas. As to a choke, choking may allow for adjusting one or more characteristics of a piece of flow equipment (e.g., a cross-sectional flow area, etc.), for example, for adjusting to fully open flow, for adjusting to choked flow and/or for adjusting to no flow (e.g., closed).

As an example, a choke may include an orifice that is used to control fluid flow rate or downstream system pressure. As an example, a choke may be provided in any of a variety of configurations (e.g., for fixed and/or adjustable modes of operation). As an example, an adjustable choke may enable fluid flow and pressure parameters to be changed to suit process or production requirements. As an example, a fixed choke may be configured for resistance to erosion under prolonged operation or production of abrasive fluids.

The oilfield network 302 may be a gathering network and/or an injection network. A gathering network may be an oilfield network used to obtain hydrocarbons from a wellsite (e.g., the wellsite 1 312, the wellsite n 314, etc.). In a gathering network, hydrocarbons may flow from the wellsites to the processing facility 320. An injection network may be an oilfield network used to inject the wellsites with injection substances, such as water, carbon dioxide, and other chemicals that may be injected into the wellsites. In an injection network, the flow of the injection substance may flow towards the wellsite (e.g., toward the wellsite 1 312, the wellsite n 314, etc.).

The oilfield network 302 may also include one or more surface units (e.g., a surface unit 1 316, a surface unit n 318, etc.), for example, a surface unit for each wellsite. Such surface units may include functionality to collect data from sensors (see, e.g., the surface unit 216 of FIG. 2). Such sensors may include sensors for measuring flow rate, water cut, gas lift rate, pressure, and/or other such variables related to measuring and monitoring hydrocarbon production. As shown, the oilfield network 302 can include one or more transceivers 321, for example, to receive information, to transmit information, to receive information and transmit information, etc. As an example, information may be received and/or transmitted via wire and/or wirelessly. As an example, information may be received and/or transmitted via a communications network such as, for example, the Internet, the Cloud, a cellular network, a satellite network, etc.

As an example, the oilfield production tool 304 may be connected to the oilfield network 302. The oilfield production tool 304 may be a simulator (e.g., a simulation framework) or a plug-in for a simulator (e.g., or other application(s)). The oilfield production tool 304 may include one or more transceivers 322, a report generator 324, an oilfield modeler 326, and an oilfield analyzer 328. As an example, the one or more transceivers 322 may be configured to receive information, to transmit information, to receive information and transmit information, etc. As an example, information may be received and/or transmitted via wire and/or wirelessly. As an example, information may be received and/or transmitted via a communications network such as, for example, the Internet, the Cloud, a cellular network, a satellite network, etc.

As an example, one or more of the one or more transceivers 322 may include functionality to collect oilfield data. The oilfield data may be data from sensors, historical data, or any other such data. One or more of the one or more transceivers 322 may also include functionality to interact with a user and display data such as a production result.

As an example, the report generator 324 can include functionality to produce graphical and textual reports. Such reports may show historical oilfield data, production models, production results, sensor data, aggregated oilfield data, or any other such type of data.

As an example, the data repository 352 may be a storage unit and/or device (e.g., a file system, database, collection of tables, or any other storage mechanism) for storing data, such as the production results, sensor data, aggregated oilfield data, or any other such type of data. As an example, the data repository 352 may include multiple different storage units and/or hardware devices. Such multiple different storage units and/or devices may or may not be of the same type or located at the same physical site. As an example, the data repository 352, or a portion thereof, may be secured via one or more security protocols, whether physical, algorithmic or a combination thereof (e.g., data encryption, secure device access, secure communication, etc.).

In the example of FIG. 3, the oilfield modeler 326 can include functionality to create a model of a wellbore and an oilfield network. As shown, the oilfield modeler 326 includes a wellbore modeler 360 and a network modeler 332. As an example, the wellbore modeler 360 can allow a user to create a graphical wellbore model or single branch model. As an example, a wellbore model can define operating parameters (e.g., actual, theoretical, etc.) of a wellbore (e.g., pressure, flow rate, etc.). As an example, a single branch model may define operating parameters of a single branch in an oilfield network.

As to the network modeler 332, it may allow a user to create a graphical network model that combines wellbore models and/or single branch models. As an example, the network modeler 328 and/or wellbore modeler 360 may model pipes in the oilfield network 302 as branches of the oilfield network 302 (e.g., optionally as one or more segments, optionally with one or more nodes, etc.). In such an example, each branch may be connected to a wellsite or a junction. A junction may be defined as a group of two or more pipes that intersect at a particular location (e.g., a junction may be a node or a type of node).

As an example, a modeled oilfield network may be formed as a combination of sub-networks. In such an example, a sub-network may be defined as a portion of an oilfield network. For example, a sub-network may be connected to the oilfield network 302 using at least one branch. Sub-networks may be a group of connected wellsites, branches, and junctions. As an example, sub-networks may be disjoint (e.g., branches and wellsites in one sub-network may not exist in another sub-network).

As an example, the oilfield analyzer 328 can include functionality to analyze the oilfield network 302 and generate a production result for the oilfield network 302. As shown in the example of FIG. 3, the oilfield analyzer 328 may include one or more of the following: a production analyzer 334, a fluid modeler 336, a flow modeler 338, an equipment modeler 340, a single branch solver 342, a network solver 344, a Wegstein solver 348, a Newton solver 350, and an offline tool 346.

As an example, the production analyzer 334 can include functionality to receive a workflow request and interact with the single branch solver 342 and/or the network solver 344 based on particular aspects of the workflow. For example, the workflow may include a nodal analysis to analyze a wellsite or junction of branches, pressure and temperature profile, model calibration, gas lift design, gas lift optimization, network analysis, and other such workflows.

As an example, the fluid modeler 336 can include functionality to calculate fluid properties (e.g., phases present, densities, viscosities, etc.) using one or more compositional and/or black-oil fluid models. The fluid modeler 336 may include functionality to model oil, gas, water, hydrate, wax, and asphaltene phases. As an example, the flow modeler 338 can include functionality to calculate pressure drop in pipes (e.g., pipes, tubing, etc.) using industry standard multiphase flow correlations. As an example, the equipment modeler 340 can include functionality to calculate pressure, temperature and flow changes in equipment pieces (e.g., chokes, pumps, compressors, etc.). As an example, one or more substances may be introduced via a network for purposes of managing asphaltenes, waxes, etc. As an example, a modeler may include functionality to model interaction between one or more substances and fluid (e.g., including material present in the fluid).

As an example, the single branch solver 342 may include functionality to calculate the flow, pressure drop and changes to fluid temperature in a wellbore or a single flowline branch given various inputs.

As an example, the network solver 344 can includes functionality calculate a flow rate, pressure drop and changes to fluid temperature throughout the oilfield network 302. The network solver 344 may be configured to connect to the offline tool 346, the Wegstein solver 348, and the Newton solver 350. As an example, alternatively or additionally, one or more other solvers may be provided, for example, consider a sequential linear programming solver (SLP), a sequential quadratic programming solver (SQP), etc. As an example, a solver may be part of the production tool 304, part of the analyzer 328 of the production tool 304, part of a system to which the production tool 304 may be operatively coupled, etc.

As an example, the offline tool 346 may include a wells offline tool and a branches offline tool. A wells offline tool may include functionality to generate a production model using the single branch solver 342 for a wellsite or branch. A branches offline tool may include functionality to generate a production model for a sub-network using the production model for a wellsite, a single branch, or a sub-network of the sub-network.

As an example, a production model may be capable of providing a description of a wellsite with respect to various operational conditions. A production model may include one or more production functions that may be combined, for example, where each production function may be a function of variables related to the production of hydrocarbons. For example, a production function may be a function of flow rate and/or pressure and/or temperature. Further, a production function may account for environmental conditions related to a sub-network of the oilfield network 302, such as changes in elevation (e.g., for gravity head, pressure, etc.), diameters of pipes, combination of pipes, changes in pressure resulting from joining pipes and changes pipe or production environmental data such as ambient temperature (ambient fluid velocity etc.). A production model may provide estimates of flow rate for a wellsite or sub-network of an oilfield network.

As an example, one or more separate production functions may exist that can account for changes in one or more values of an operational condition. An operational condition may identify a property of hydrocarbons or injection substance. For example, an operational condition may include a water-cut (WC), reservoir pressure, gas lift rate, etc. Other operational conditions, variables, environmental conditions may be considered.

As to the network solver 344, in the example of FIG. 3, it is shown as being connected to the Wegstein solver 348 and/or the Newton solver 350. The Wegstein solver 348 and the Newton solver 350 include functionality to combine a production model for several sub-networks to create a production result that may be used to plan an oilfield network, optimize flow rates of wellsites in an oilfield network, and/or identify and address faulty components within an oilfield network. The Wegstein solver 348 can use an iterative method with Wegstein acceleration.

An oilfield network may be solved by identifying pressure drop (e.g., pressure differential), for example, through use of momentum equations. As an example, an equation for pressure differential may account for factors such as fluid potential energy (e.g., hydrostatic pressure), friction (e.g., shear stress between conduit wall and fluid), and acceleration (e.g., change in fluid velocity). As an example, an equation may be expressed in terms of static reservoir pressure, a flowing bottom hole pressure and flowrate. As an example, equations may account for vertical, horizontal or angled arrangements of equipment. Various examples of equations may be found in a dynamic multiphase flow simulator such as the simulator of the OLGA simulation framework (SLB, Houston, TX), which may be implemented for design and diagnostic analysis of oil and gas production systems. As an example, a simulation framework may include one or more sets of instructions for building a model; for fluid and multiphase flow modeling; for reservoir, well and completion modeling; for field equipment modeling; and for operations (e.g., artificial lift, gas lift, wax prediction, nodal analysis, network analysis, field planning, multi-well analysis, etc.).

As an example, a system may implement equations that include dynamic conservation equations for momentum, mass and energy. As an example, pressure and momentum can be solved implicitly and simultaneously and, for example, conservation of mass and energy (e.g., temperature) may be solved in succeeding separate stages.

As an example, an equation for pressure differential can account for factors such as fluid potential energy (e.g., hydrostatic pressure), friction (e.g., shear stress between conduit wall and fluid), and acceleration (e.g., change in fluid velocity). In addition, as mentioned, equations can be used to take into account dynamic aspects. For example, equations can account for time and forces to accelerate and decelerate fluid (e.g., and objects) inserted into multiphase flow (e.g., consider pigs, etc.). As an example, an approach may consider the time it takes to conserve mass and energy (e.g., an amount of time it takes to drain a system, pipeline or vessel). As an example, an approach may consider ramp-up time for production, for example, from one production rate to another production rate, etc. As an example, an approach may consider time it takes before a first condensate appears at an outlet of a production network during startup, etc.

As an example, an equation for a pressure differential (e.g., ΔP) may be rearranged to solve for flow rate (e.g., Q), where the equation may include the Reynolds number (e.g., Re, a dimensionless ratio of inertial to viscous forces), one or more friction factors (e.g., which may depend on flow regime), etc.

Through use of equations for flow into and out of a branch and equating to zero, a linear matrix in unknown pressures may be obtained. As an example, fixed flow branches (i.e., branches in which the flow does not change) may be solved directly for the node pressures.

As an example, a method can include defining variables and residual equations as well as branches in an oilfield network that may include a number of equipment items. As an example, a branch may be divided into sub-branches with each sub-branch containing a single equipment item. As an example, a new node may be used to join each pair of sub-branches. In this example, primary Newton-Raphson variables can include a flow (ab) in each sub-branch in the network and a pressure Pin at each node in the network. In this example, temperature (or enthalpy) and composition may be treated as secondary variables.

As an example, residual equations may include a branch residual, an internal node residual, and a boundary condition. In such an example, a branch residual for a sub-branch relates the branch flow to the pressure at the branch inlet node and the pressure at the outlet node. As an example, internal node residuals can define where total flow into a node is equal to total flow out of the node.

As an example, determining an initial solution may be performed using a production model where for each subsequent iteration, a Jacobian matrix is calculated. The values of the Jacobian matrix may be used to solve a Jacobian equation for the Newton-Raphson update. To solve the Jacobian equation, one or more types of matrix solvers may be used.

In the example of FIG. 3, the one or more data sources 306 include one or more types of repositories for data. For example, the one or more data sources 306 may be Internet sources, sources from a company having ties to the oilfield network 302, or any other location in which data may be obtained. The data may include historical data, data collected from other oilfield networks, data collected from the oilfield network being modeled, data describing environmental or operational conditions.

In the example of FIG. 3, the one or more oilfield applications 308 may be applications related to the production of hydrocarbons. The one or more oilfield applications 308 may include functionality to evaluate a formation, manage drilling operations, evaluate seismic data, evaluate workflows in the oilfield, perform simulations, or perform any other oilfield related function. In the example of FIG. 3, the one or more plug-ins 310 may allow integration with packages such as, for example, a TUFPP model, an Infochem Multiflash model (Infochem Computer Services Ltd., London, UK), an equipment model, etc. (e.g., consider one or more simulators like HYSYS (AspenTech, Burlington, Massachusetts), UNISIM (Honeywell, Morristown, New Jersey), etc.).

While the example of FIG. 3 shows the oilfield production tool 304 as a separate component from the oilfield network 302, the oilfield production tool 304 may alternatively be part of the oilfield network 302. For example, the oilfield production tool 304 may be located at one of the wellsites (e.g., the wellsite 1 312, the wellsite n 314, etc.), at the processing facility 320, or any other location in the oilfield network 302. As another example, the oilfield production tool 304 may exist separate from the oilfield network 302, such as when the oilfield production tool 304 is used to plan the oilfield network.

Various types of numerical solution schemes may be characterized as being explicit or implicit. For example, when a direct computation of dependent variables can be made in terms of known quantities, a scheme may be characterized as explicit. Whereas, when dependent variables are defined by coupled sets of equations, and either a matrix or iterative technique is implemented to obtain a solution, a scheme may be characterized as implicit.

As an example, a scheme may be characterized as adaptive implicit ("AIM"). An AIM scheme may adapt, for example, based on one or more gradients as to one or more variables, properties, etc. of a model. For example, where a model of a subterranean environment includes a region where porosity varies rapidly with respect to one or more physical dimensions (e.g., x, y, or z), a solution for one or more variables in that region may be modeled using an implicit scheme while an overall solution for the model also includes an explicit scheme (e.g., for one or more other regions for the same one or more variables).

As an example, a scheme may be implemented as part of the ECLIPSE reservoir simulator and/or the INTERSECT reservoir simulator (SLB, Houston, Texas). As an example, the aforementioned OLGA simulator may include an interface that allows for interoperability with an ECLIPSE simulator. The ECLIPSE reservoir simulator may implement a fully implicit scheme or an implicit-explicit scheme that is implicit in pressure and explicit in saturation, known as IMPES. In the fully implicit scheme, values for both pressure and saturation are provided at the end of each simulation time-step; whereas, the IMPES scheme uses saturation values from the beginning of the time-step to solve for pressure values at the end of the time-step. In such examples, a reservoir simulator iterates until pressures values in grid blocks of a model of the reservoir being simulated have reached some internally consistent solution. However, a solution may be difficult to find if saturation (which the IMPES scheme assumes is constant within a time-step) changes rapidly during that time-step (e.g., a large percentage change in grid block values for saturation). The IMPES scheme may be able to cope with such an issue by decreasing "length" (e.g., duration) of the time-step but at the cost of more time-steps (e.g., in an effort to achieve a more stable solution).

The aforementioned fully implicit scheme may be a more stable option with saturation and pressure being obtained simultaneously so as any difference between their values for one time-step and a next time-step does not disturb a solution process as much as when compared to the IMPES scheme. Thus, in a fully implicit scheme, the "length" (e.g., duration) of a time-step may be larger but it also means that the fully implicit scheme may take additional processing time to achieve solutions (e.g., in comparison with an IMPES scheme). However, in a reservoir where properties change rapidly, a fully implicit scheme may provide a solution in less computational time than an IMPES scheme, even though an iteration of the fully implicit scheme may take longer to complete when compared to an iteration of the IMPES scheme.

As mentioned, a production system can provide for transportation of oil and gas fluids from well locations along flowlines which are interconnected at junctions to combine fluids from many wells for delivery to a processing facility. Along these flowlines (including at one or more ends of a flowline), production equipment may be inserted to modify the flowing characteristics like flow rate, pressure, composition and temperature. As an example, a boundary condition may depend on a type of equipment, operation of a piece of equipment, etc.

Figure 4:
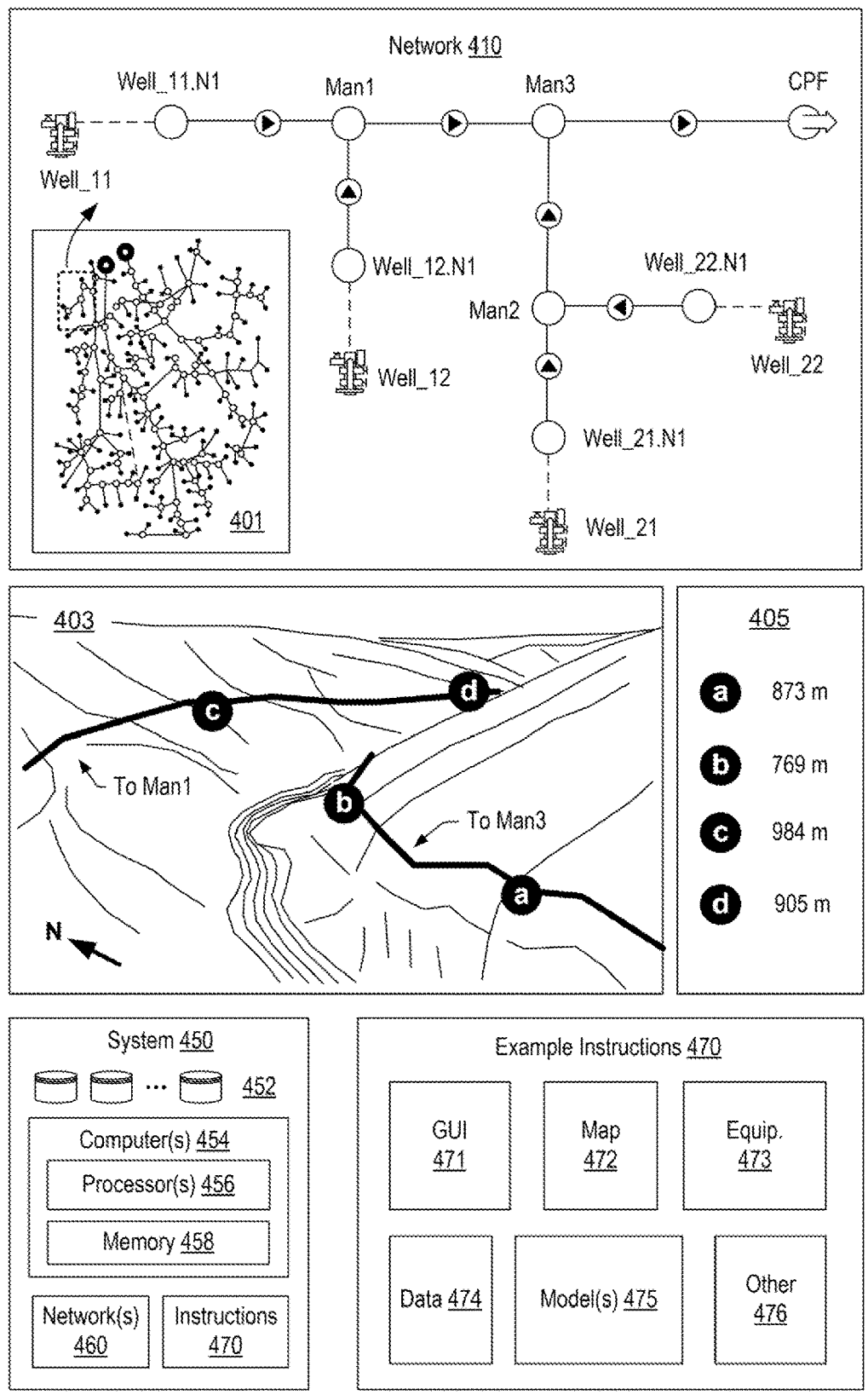
FIG. 4 illustrates an example of a network, an example of a system and examples of instructions.

FIG. 4 shows an example of a relatively small production system network 410 (e.g., optionally a portion of a larger network 401), an example of a system 450 and examples of instructions 470. As shown, the network 410 forms somewhat of a tree like structure where flowlines represent branches (e.g., segments) and junctions represent nodes. As shown in FIG. 4, the network 410 provides for transportation of oil and gas fluids from well locations along flowlines interconnected at junctions with final delivery at a central processing facility.

In the example of FIG. 4, various portions of the network 410 may include conduit. For example, consider a perspective view of a geologic environment 403 that includes two conduits which may be a conduit to Man1 and a conduit to Man3 in the network 410. The conduits may be specified at various points by characteristics, which may be characteristics of the environment, characteristics of the conduits, characteristics of fluid in the conduits, etc. For example, consider conduit elevation, which may allow for determination of conduit inclination. As an example, consider conduit cross-sectional flow area, which may be defined by one or more parameters such as, for example, a conduit diameter. As an example, consider fluid that may flow in a conduit where the fluid may be characterized at least in part by a property such as, for example, viscosity (see, e.g., the ternary diagram 250 and the table 260 of FIG. 2 and approaches to multiphase properties, etc.). As an example, thermal conditions may optionally be considered such as, for example, latent heat, heat transfer, etc. As an example, thermal conditions may depend on insulation of equipment, temperature of an environment, wind, sun, rain, snow, etc. Such factors may be considered when assessing an existing network, developing a network, extending a network, etc.

As an example, given information of operating condition(s) at boundary nodes (e.g., where fluid enters and exists the system) and the physical environment between them (e.g., geographical location, elevation, ambient temperature, etc.), a production engineer may aim to design a production system that meets business and regulatory requirements constrained to operating limits of available equipment.

As an example, a method can include implementing one or more components to simulate steady state operation of a production system, for example, as including a network (e.g., as a sub-network, etc.) as in the example of FIG. 4 (also see, e.g., FIG. 1). Such a method may include simulating the steady state operation over a selected range of operating conditions and configurations (e.g., optionally a broadest reasonable range).

As explained, a production system may provide for transportation of oil and gas fluids from well locations to a processing facility and can represent a substantial investment in infrastructure with both economic and environmental impact. Simulation of such a system, which may include hundreds or thousands of flow lines and production equipment interconnected at junctions to form a network, can be complex and involve multiphase flow science and engineering and mathematical methods to provide solutions (e.g., by solving large systems of non-linear equations). Factors associated with solid formation, corrosion and erosion, and environmental impact may increase complexity and cost.

As shown in FIG. 4, the example system 450 includes one or more information storage devices 452, one or more computers 454, one or more networks 460 and instructions 470 (e.g., organized as one or more sets of instructions). As to the one or more computers 454, each computer may include one or more processors (e.g., or processing cores) 456 and memory 458 for storing the instructions 470 (e.g., one or more sets of instructions), for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 452. As an example, information that may be stored in one or more of the storage devices 452 may include information about equipment, location of equipment, orientation of equipment, fluid characteristics, etc.

As an example, the instructions 470 can include instructions (e.g., stored in the memory 458) executable by at least one of the one or more processors 456 to instruct the system 450 to perform various actions. As an example, the system 450 may be configured such that the instructions 470 provide for establishing a framework, for example, that can perform network modeling. As an example, one or more methods, techniques, etc. may be performed using one or more sets of instructions, which may be, for example, the instructions 470 of FIG. 4.

FIG. 4 shows examples of the instructions 470 as including a graphical user interface (GUI) component 471, a map component 472, an equipment component 473, a data component 474 (e.g., for measured data, synthetic data, etc.), a modeling component 475, and one or more other component 476 where a component can be or include a set of instructions.

As an example, a component can include instructions to instruct a system to render terrain and equipment locations to a display (e.g., via the GUI component 471, the map component 472, the equipment component 473, etc.); receive data for at least a portion of a network (e.g., via the data component 474); analyze the data with respect to a model associated with the terrain and the equipment locations (e.g., via the modeling component 475); and render information to the display based at least in part on an analysis (e.g., via the GUI component 471, a report component, etc.).

As an example, a framework may be implemented using various features of a system such as, for example, the system 450 of FIG. 4. As an example, one or more sets of instructions may be provided that include instructions that may be executed by a processor or processors. As an example, instructions may be provided for execution of instructions in parallel, for example, to consider multiple features of a network or networks that may be associated with a geologic environment such as the geologic environment 110 of FIG. 1.

Production systems for oil and gas often cover multiple wells tied back to a manifold, platform or onshore, etc. (e.g., consider a sub-sea manifold, a wellhead platform, a land-based manifold, etc.). At a manifold or wellhead platform, production from different wells may be co-mingled (e.g., merged, mixed, etc.) and fed to one or more multiphase pipelines that can transport fluid, for example, to topside or central processing facilities. As an example, multiple manifolds and wellhead platforms may feed one topside/central processing facility. As an example, produced fluid from a topside/central processing facilities may again be fed to export pipelines for gas and/or oil to feed a market or a chemical processing plant.

As an example, a fluid production network can include a substantially vertical conduit and a substantially horizontal conduit and/or a substantially vertical conduit and/or a conduit that is neither substantially horizontal nor substantially vertical. As an example, a substantially vertical conduit can be oriented at an angle with respect to horizontal that is greater than about 50 degrees. As an example, a substantially horizontal conduit can be oriented at an angle with respect to horizontal that is less than about 40 degrees (e.g., between −40 degrees and +40 degrees depending on whether sloping down or up with respect to a direction, which may be a flow direction). As an example, a model or models can account for orientation, for example, as one or more parameters of a model or models.

As an example, a fluid production network can be or include a multiphase fluid production network. As an example, values output via a model-based framework can include values for fluid flow variables at a plurality of different times (e.g., single phase, multiphase, etc.).

As an example, a framework may be optionally coupled to one or more data transmission systems, which may include, for example, a supervisory control and data acquisition (SCADA) system. For example, a framework may provide for monitoring a production system using one or more models where, responsive to model-based results, one or more notifications (e.g., instructions, commands, alarms, etc.) may be communicated via one or more data transmission systems. As an example, a SCADA system can include equipment for monitoring and control, which may operate, for example, with coded signals over communication channels (e.g., a communication channel per remote station, etc.).

As mentioned, slug flow can be associated with gas in a pipeline. Gas can be naturally occurring and/or injected. For example, consider an artificial lift technique that utilizes gas, which may be injected at one or more points in a system that can include downhole points, underwater points and/or surface points.

Figure 5:
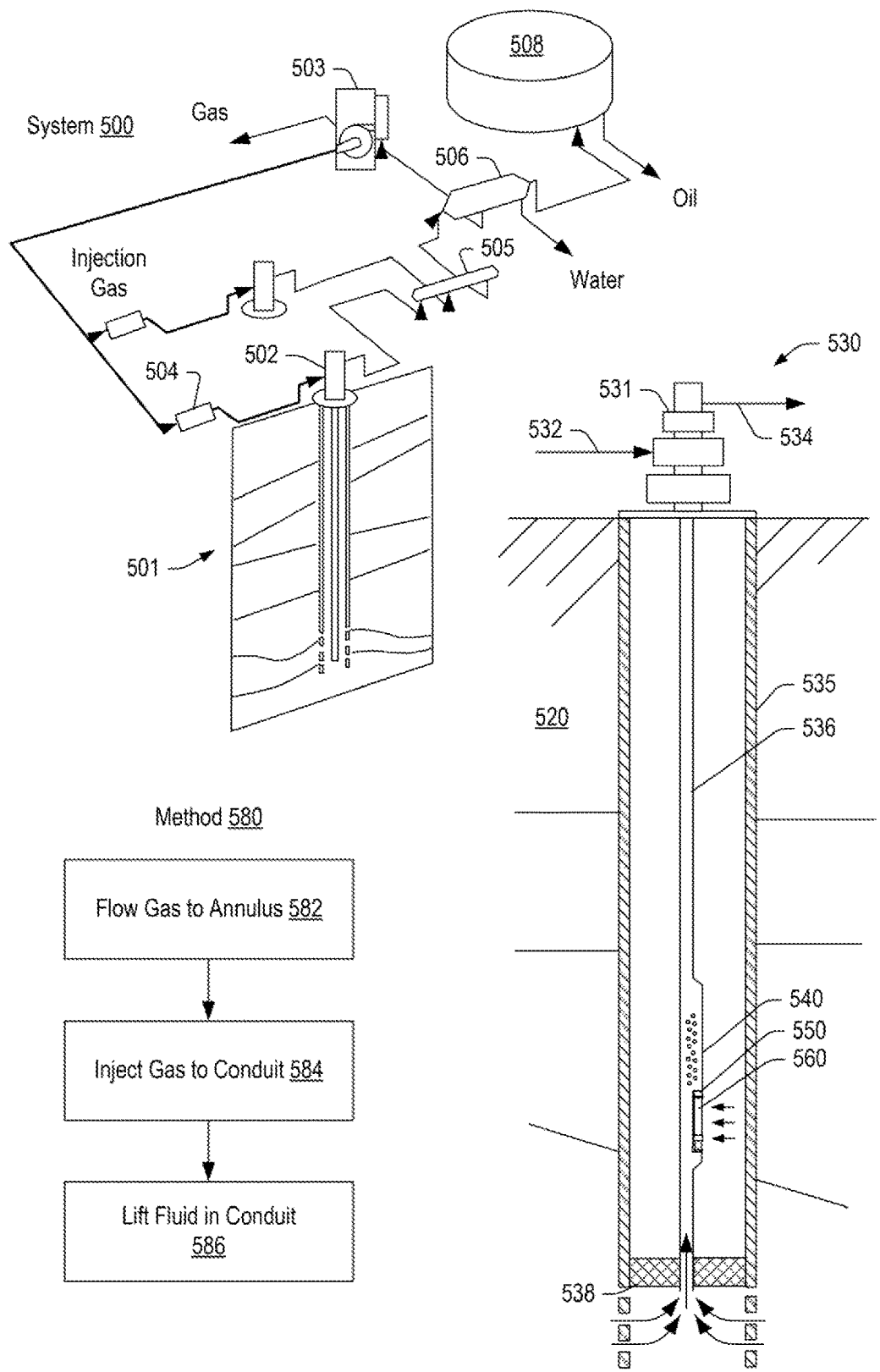
FIG. 5 illustrates an example of a system and an example of a method.

FIG. 5 shows an example of a system 500 that includes various types of equipment where at least some of the equipment may scale and/or affect a scaling mechanism. For example, gas lift equipment can experience scale formation and, for example, may alter one or more of pressure, temperature, chemistry, phase dynamics, etc. In the example of FIG. 5, various fluid system components are at surface and various fluid system components are subsurface; noting that various fluid system component can extend from a position that is subsurface to a position that is at surface.

In FIG. 5, the system 500 is shown with an example of a geologic environment 520 that includes equipment and an example of a method 580. The system 500 includes a subterranean formation 501 with a well 502. Injection gas is provided to the well 502 via a compressor 503 (e.g., a fluid pump, etc.) and a regulator 504 (e.g., a fluid controller). The injection gas can assist with lifting fluid that flows from the subterranean formation 501 to the well 502. The lifted fluid, including injected gas, may flow to a manifold 505 (e.g., a fluid system component with multiple fluid inlets and/or fluid outlets), for example, where fluid from a number of wells may be combined. As shown in the example of FIG. 5, the manifold 505 can be operatively coupled to a separator 506, which may separate components of the fluid. For example, the separator 506 may separate oil, water and gas components as substantially separate phases of a multiphase fluid. In such an example, oil may be directed to an oil storage facility 508 via tubing while gas may be directed to the compressor 503 via tubing, for example, for re-injection, storage and/or transport to another location. As an example, water may be directed to a water discharge, a water storage facility, etc. As an example, in various subsea systems, due to differences between land and sea, a separator and associated separation process may not be present.

As shown in FIG. 5, the geologic environment 520 is fitted with well equipment 530, which includes a well-head 531 (e.g., a Christmas tree, etc.), an inlet conduit 532 for flow of compressed gas, an outlet conduit 534 for flow of produced fluid, a casing 535, a production conduit 536, and a packer 538 that forms a seal between the casing 535 and the production conduit 536. As shown, fluid may enter the casing 535 (e.g., via perforations) and then enter a lumen of the production conduit 536, for example, due to a pressure differential between the fluid in the subterranean geologic environment 520 and the lumen of the production conduit 536 at an opening of the production conduit 536. Where the inlet conduit 532 for flow of compressed gas is used to flow gas to the annular space between the casing 535 and the production conduit 536, a mandrel 540 operatively coupled to the production conduit 536 that includes a pocket 550 that seats a gas lift valve 560 that may regulate the introduction of the compressed gas into the lumen of the production conduit 536. In such an example, the compressed gas introduced may facilitate flow of fluid upwardly to the well-head 531 (e.g., opposite a direction of gravity) where the fluid may be directed away from the well-head 531 via the outlet conduit 534.

As shown in FIG. 5, the method 580 can include a flow block 582 for flowing gas to an annulus (e.g., or, more generally, a space exterior to a production conduit fitted with a gas lift valve), an injection block 584 for injecting gas from the annulus into a production conduit via a gas lift valve or gas lift valves and a lift block 286 for lifting fluid in the production conduit due in part to buoyancy imparted by the injected gas.

As an example, a production process may optionally utilize one or more fluid pumps such as, for example, an electric submersible pump (e.g., consider a centrifugal pump, a rod pump, etc.). As an example, a production process may implement one or more so-called "artificial lift" technologies. An artificial lift technology may operate by adding energy to fluid, for example, to initiate, enhance, etc. production of fluid.

As an example, a method can include gas lift optimization where supply gas and a number of gas injection points are taken into account to determine an optimal manner to distribute the supply gas to achieve one or more goals, which can include production goals, fluid behavior goals, etc. For example, consider a method that can optimize distribution of supply gas in a manner that aims to reduce instances of slug flow. In such an example, a controller may be utilized that implements feedback to control delivery of supply gas to one or more points, which, as mentioned, can include downhole, underwater and/or surface points. As explained, slug flow can occur in a manner related to gravity such as, for example, in a riser, which, as mentioned, may have an S-shape. Slug flow can be an unstable phenomenon that causes flow to be periodic or otherwise irregular. Slug flow can interfere with sensor readings, particularly where sensor readings may be less frequent than slug flow halts and surges. For example, if slug flow cycles occur more rapidly than measurements taken from sensors, such measurements may be representative of a halt or a surge of different flow cycles, etc. To address slug flow, a system can include a controller that receives sensor data (e.g., sensor measurements) that can be utilized as feedback for the controller where the controller can control delivery of supply gas to one or more points in the system to reduce instances of slug flow in the system.

Figure 6:
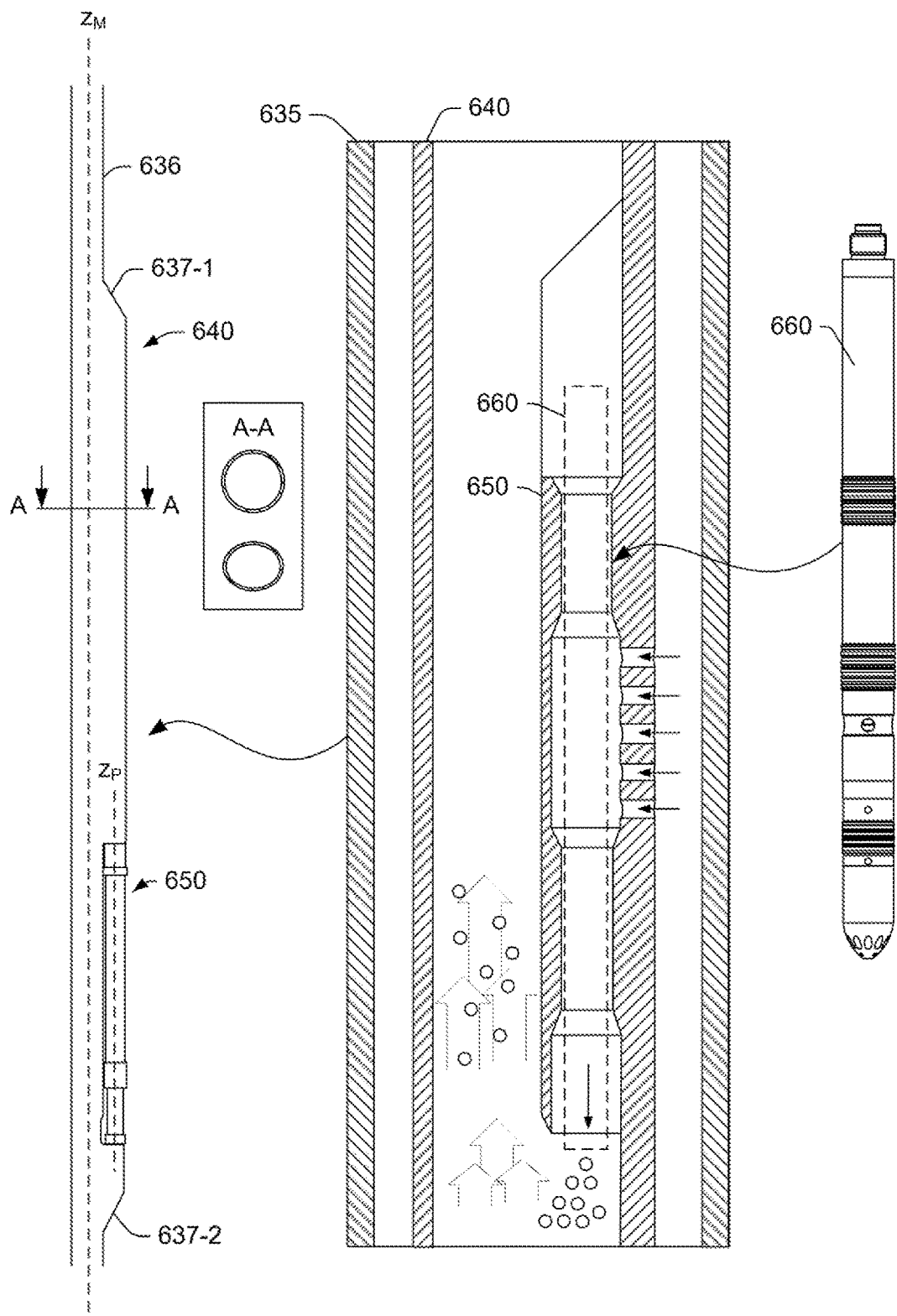
FIG. 6 illustrates an example of a system.

FIG. 6 shows an example of a gas lift system 600 that includes a casing 635, a production conduit 636 and a mandrel 640 that includes a pocket 650 that seats a gas lift valve 660. As shown, the mandrel 640 can include a main longitudinal axis ($z_M$) and a side pocket longitudinal axis ($z_P$) that is offset a radial distance from the main longitudinal axis ($z_M$). In the example of FIG. 6, the axes ($z_M$ and $z_P$) are shown as being substantially parallel such that a bore of the pocket 650 is parallel to a lumen of the mandrel 640. Also shown in FIG. 6 are two examples of cross-sectional profiles for the mandrel 640, for example, along a line A-A. As shown, a mandrel may include a circular cross-sectional profile or another shaped profile such as, for example, an oval profile.

As an example, a completion may include multiple instances of the mandrel 640, for example, where each pocket of each instance may include a gas lift valve where, for example, one or more of the gas lift valves may differ in one or more characteristics from one or more other of the gas lift valves (e.g., pressure settings, etc.).

As shown in the example of FIG. 6, the mandrel 640 can include one or more openings that provide for fluid communication with fluid in an annulus (e.g., gas and/or other fluid), defined by an outer surface of the mandrel 640 and an inner surface of the casing 635, via a gas lift valve 660 disposed in the pocket 650. For example, the gas lift valve 660 may be disposed in the pocket 650 where a portion of the gas lift valve 660 is in fluid communication with an annulus (e.g., with casing fluid) and where a portion of the gas lift valve 660 is in fluid communication with a lumen (e.g., with tubing fluid). In such an example, fluid may flow from the annulus to the lumen (e.g., bore) to assist with lift of fluid in the lumen or, for example, fluid may flow from the lumen to the annulus. The pocket 650 may include an opening that may be oriented downhole and one or more openings that may be oriented in a pocket wall, for example, directed radially to a lumen space. As an example, the pocket 650 may include a production conduit lumen side opening (e.g., an axial opening) for placement, retrieval, replacement, adjustment, etc. of a gas lift valve. For example, through use of a tool, the gas lift valve 660 may be accessed. As an example, where a gas lift valve includes circuitry such as a battery or batteries, a tool may optionally provide for charging and/or replacement of a battery or batteries.

In the example of FIG. 6, gas is illustrated as entering from the annulus to the gas lift valve 660 as disposed in the pocket 650. Such gas can exit at a downhole end of the gas lift valve 660 where the gas can assist in lifting fluid in the lumen of the mandrel 640 (e.g., as supplied via a bore of production tubing, etc.).

As an example, a mandrel may be fit with a gas lift valve that may be, for example, a valve according to one or more specifications such as an injection pressure-operated (IPO) valve specification. As an example, a positive-sealing check valve may be used such as a valve qualified to meet API-19G1 and G2 industry standards and pressure barrier qualifications. For example, with a test pressure rating of about 10,000 psi (e.g., about 69,000 kPa), a valve may form a metal-to-metal barrier between production tubing and a casing annulus that may help to avoid undesired communication (e.g., or reverse flow) and to help mitigate risks associated with gas lift valve check systems.

While a gas lift valve is illustrated and described as being suitable for downhole use, one or more other types of gas injection valves may be utilized at one or more points in a system. As explained, injected gas can provide benefits such as helping to move fluid such as fluid that includes hydrocarbon to a processing facility. However, injected gas and/or other gas can lead to undesirable flow behaviors, which can include, for example, one or more of slug flow, casing-heading and/or other types of instabilities.

As an example, casing-heading slugs can occur in gas-lifted wells where an annulus is built around the well and filled with gas. In such an approach, gas can be injected through a check-valve at the bottom of the well. Casing-heading instabilities tend to be a periodic phenomenon, which can include several pressure buildup phases in the casing without production and high flow-rate phases. Such oscillations can reduce overall oil production and may damage equipment and facilities.

As an example, a density-wave instability can occur in gas-lifted wells. For example, density-wave slugging may happen in long risers and wells. During gas lift, when critical flow is obtained through the gas injection, the annulus may be decoupled from the tubing such that a casing-heading instability is eliminate. However, some wells may still produce in a cyclic manner. For example, gas may accumulate at the bottom of the riser (well), creating variations in mixture density, resulting in a region with low density. In such an example, this region can travel upward as a density wave.

As an example, a method can include applying feedback control to find a minimum gas injection rate to stabilize slug flow and casing-heading in one or more wells, one or more multiphase production networks and/or one or more risers.

As explained, pipelines and networks of pipelines can be on-shore, off-shore and combined on- and off-shore. Fluid that is transported in pipelines and networks of pipelines can be, for example, two-phase or three-phase.

Transport of multi-phase fluid in production networks and wells is subject to various types of flow instabilities. As explained with respect to FIG. 2, one type of instability is called slug flow. The development of slugs of liquid in multi-phase pipelines and wells is an issue for oil producers. Terrain-induced slug flow and casing-heading in gas-lifted risers and wells can cause irregular intermittent gas and liquid flow, which can result in poor oil/water separation and foaming in separators, which can limit production capacity and cause compress trips and flaring. In an effort to overcome problems associated with slug flow and casing-heading, a production network and/or one or more wells can utilize gas lift. However, if gas is not supplied properly, such gas may, in various instances, worsen problems.

Optimal use of lift gas and the amount of lift gas for stabilizing flow in a production network and/or one or more wells may be understood via multiphase flow simulation. For example, the aforementioned OLGA simulator may be utilized.

As mentioned, a feedback control scheme can be implemented that finds an appropriate gas lift rate that stabilizes unstable flow in one or more production networks, one or more risers and/or one or more wells. In various trials, an example feedback control structure has proven to work on realistic case studies through simulations using the multiphase flow simulator OLGA.

As mentioned, a feedback controller can be implemented to find an appropriate manner of supplying lift gas (e.g., gas lift rate, etc.) to stabilize an unstable well, riser and/or production network. Through use of feedback control, a controller may operate without use of a model running in parallel with the field. However, in various instances, one or more models of a system may be utilized, which can be useful to test a control structure and determine suitable parameters for use in the feedback controller. As an example, a feedback control scheme can make use of one or more measurements where a control objective can be to adjust gas lift rate at one or more points in a system such that a suitable statistic (e.g., standard deviation, etc.) in sensor measurements becomes sufficiently small.

In statistics, the standard deviation is a measure of the amount of variation or dispersion of a set of values. A low standard deviation indicates that the values tend to be close to the mean (also called the expected value) of the set, while a high standard deviation indicates that the values are spread out over a wider range. While standard deviation is mentioned, variance and/or one or more other metrics may be utilized. In probability theory and statistics, variance is the expectation of the squared deviation of a random variable from its population mean or sample mean. Variance is a measure of dispersion, meaning it is a measure of how far a set of numbers is spread out from their average value. The variance is the square of the standard deviation, the second central moment of a distribution, and the covariance of the random variable with itself. As explained, one or more metrics may be utilized for assessment of measurements in a feedback control scheme.

Figure 7:
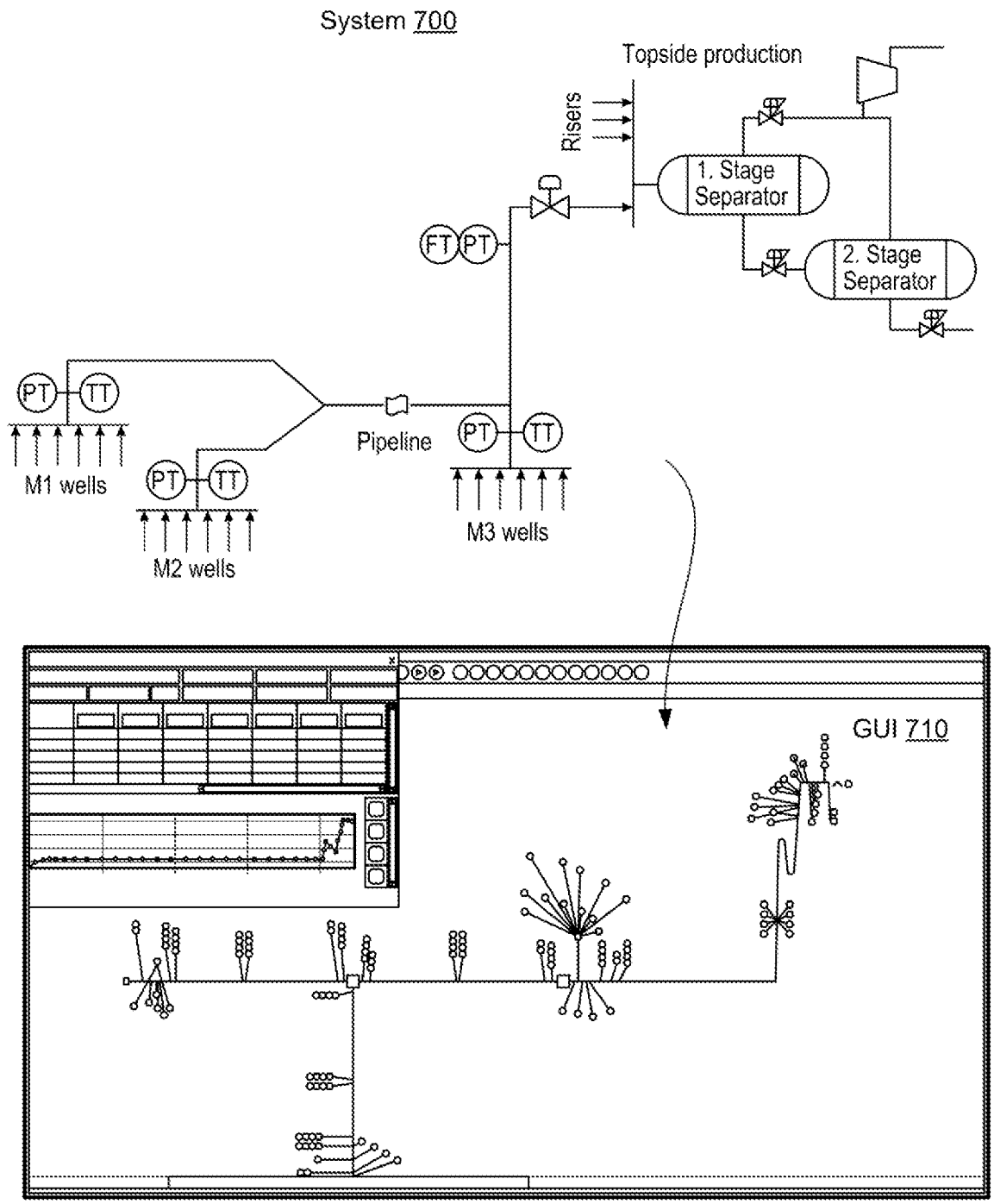
FIG. 7 illustrates an example of a system.

FIG. 7 shows an example of a system 700 that includes various sets of wells that may be production wells with and/or without gas injection, shut-in wells, wells utilized for gas injection, etc. As shown, the system 700 or a portion thereof may be represented in a graphical user interface (GUI) 710 of a framework. In the example of FIG. 7, the layout of the system 700 includes three production manifolds M1, M2 and M3 that direct flow to a riser, which may be greater than one meter, greater than 10 meters, greater than 100 meters in height (e.g., elevation gain). As shown, the riser provides fluid to surface production facility that includes one or more separators and optionally a compressor, which may compress gas separated by one or more of the one or more separators. In such an example, the separated gas may be utilized for purposes of injection and slug flow control. As an example, a field may produce excess gas such that the amount of gas available is not limiting or, for example, a field may have a limited amount of gas. In either of such instances, whether limited or not, gas delivery can be optimized for one or more purposes, which can take into account stabilization of flow.

As explained, one or more wells can be run on gas lift. In the system 700, slug flow and/or other types of instabilities may occur in the wells, production network and/or in the riser up to the production facility.

In the example of FIG. 7, the system 700 is shown in a graphical view in the GUI 710, which may be part of a model builder associated with a simulator. In the graphical view, an elevation plot is shown that indicates how a riser can be S-shaped where the riser may span a distance of more than 10 meters in height. As explained, various types of instabilities can depend on gravity where a rise in elevation can affect gas flow due in part to buoyancy. As gas rises, pressure may decrease and volume increase, which may impact and/or cause one or more types of multiphase fluid flow behaviors.

Figure 8:
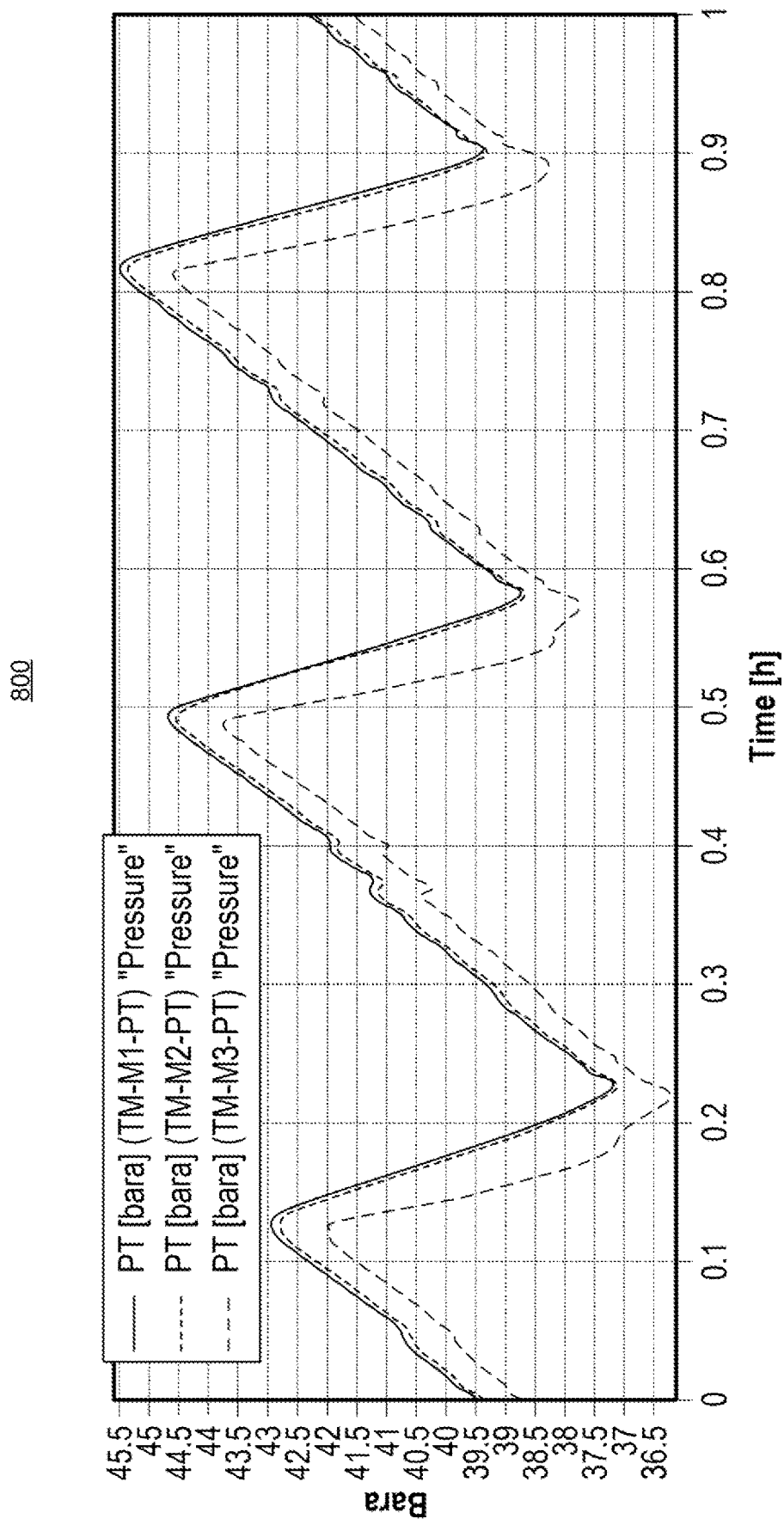
FIG. 8 illustrates an example of a graphical user interface.

FIG. 8 shows an example of a GUI 800 that includes a plot of pressure at the three manifolds M1, M2 and M3 of the system 700. As shown, the pressure at each of the manifolds can cycle and, hence, be or become unstable. In the example of FIG. 8, the cycle length is generally less than about 0.4 hours (e.g., 24 minutes). As shown, pressure increases and then decreases, as characteristic of slug flow instabilities.

Figure 9:
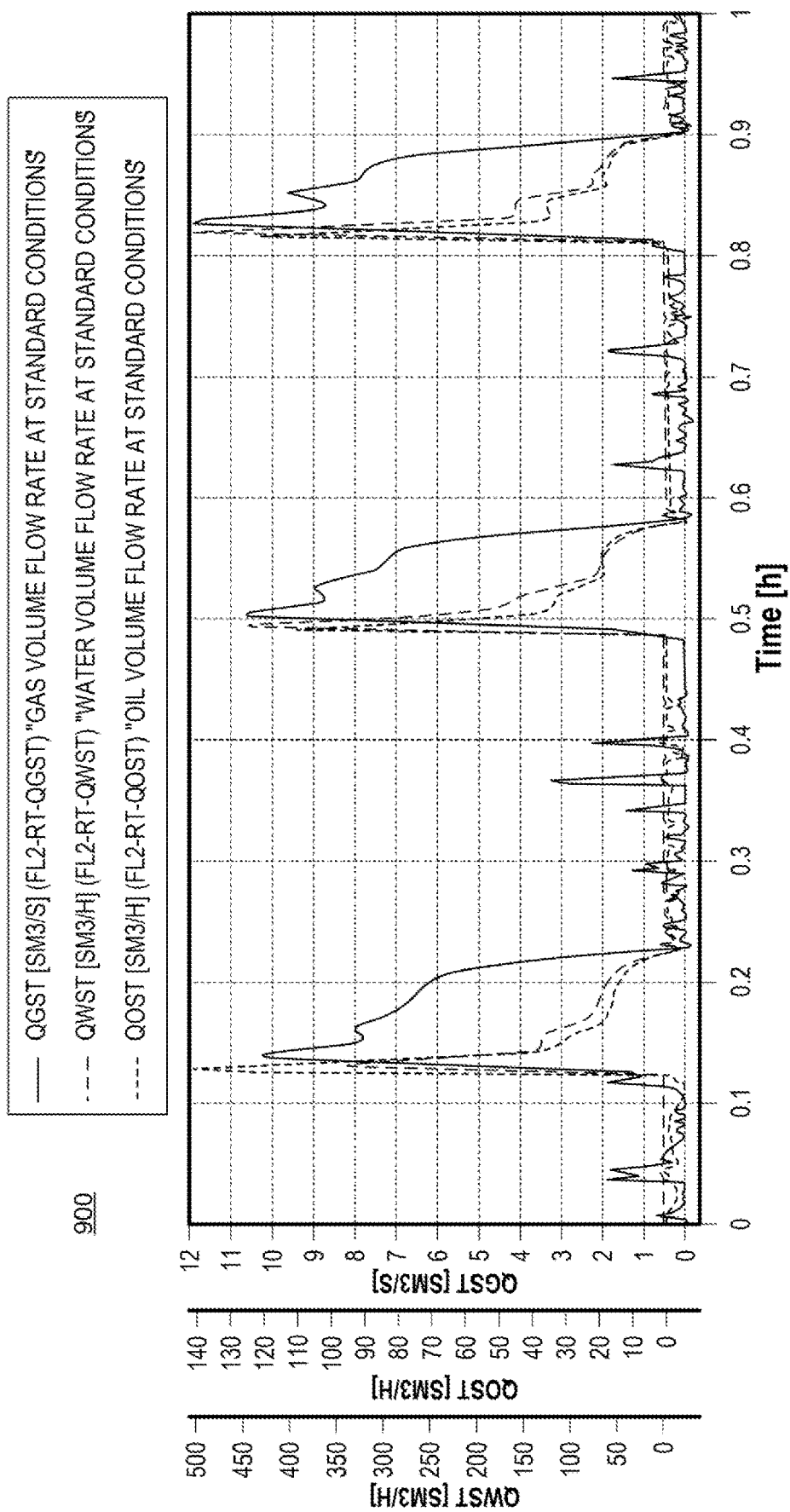
FIG. 9 illustrates an example of a graphical user interface.

FIG. 9 shows an example of a GUI 900 that includes a plot of flow at the topside (inlet to the separators). The plot in FIG. 9 shows gas volume flow rate at standard conditions, water volume flow rate at standard conditions and oil volume flow rate at standard conditions. Issues occur over a time period of approximately 0.1 hour (e.g., 6 minutes) where the behavior is relatively periodic at about every 0.4 hour (e.g., 24 minutes). As shown, the flow values with respect to time for multiphase flow and/or individual phase flow can relate to the pressure behavior at the manifolds. As shown in the GUI 900, flow decreases for about 0.2 hours and then surges for about 0.1 hour. Such behavior may be referred to as halting and surging flow, which may cycle depending on conditions, etc.

As an example, a flow assurance study on a riser utilizing lift gas in the riser base can investigate production rate as a function of supplied gas lift rate. In such an example, optimal unconstrained gas lift rate can be defined as the rate that maximizes oil production. As an example, optimal oil production can be equivalent to minimized wellhead pressure (manifold pressure).

Figure 10:
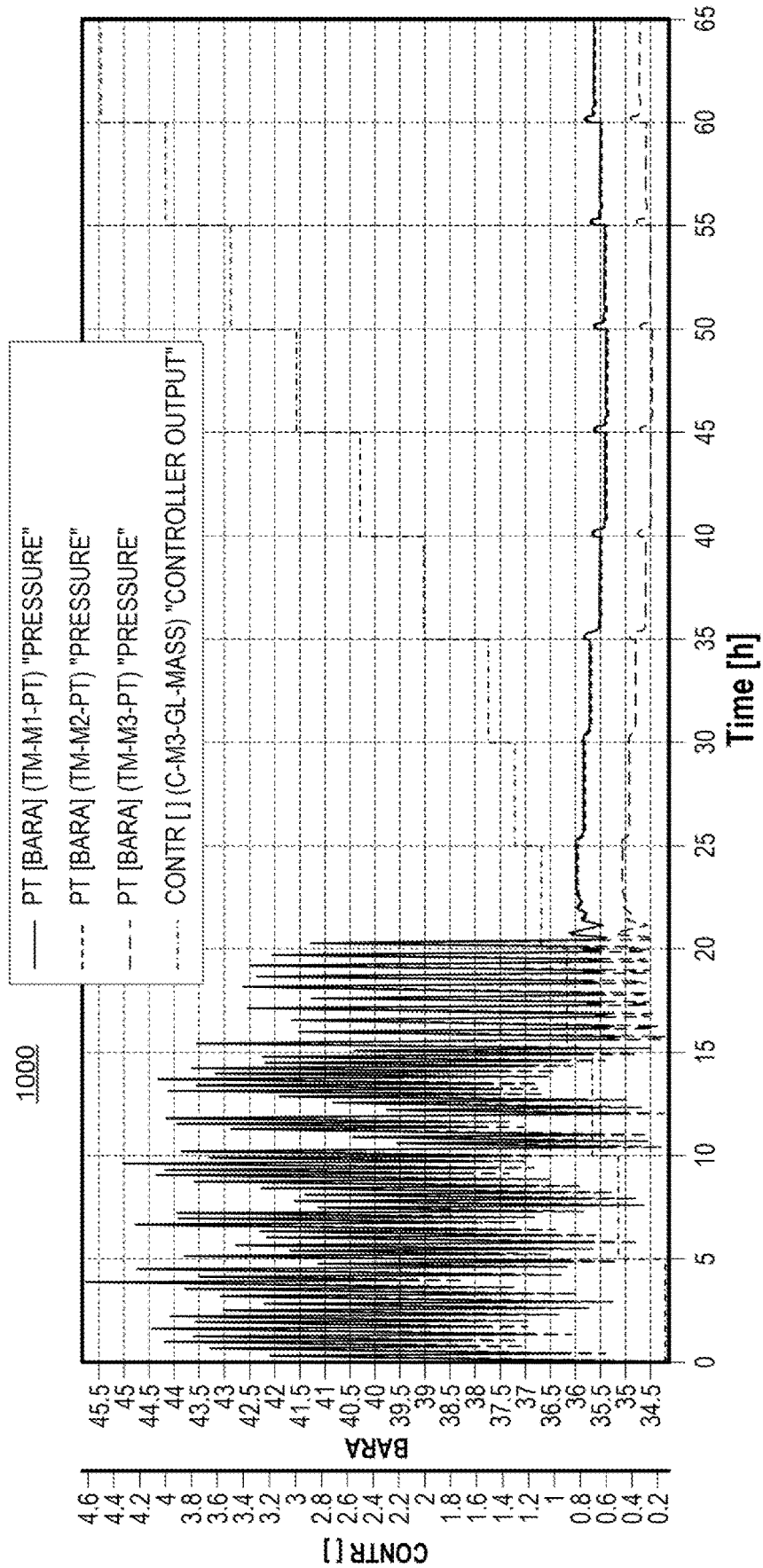
FIG. 10 illustrates an example of a graphical user interface.

FIG. 10 shows an example of a GUI 1000 that includes a plot of manifold pressure as a function of supplied lift gas flow rate where lift gas flow rate is shown and stepped up with respect to time at set intervals. Specifically, the GUI 1000 shows wellhead pressure (downstream the wellhead chokes) as a function of supplied gas lift rate where a first curve is for pressure at manifold 1 (M1), a second curve is for pressure at manifold 2 (M2) and a third curve is for pressure at manifold 3 (M3) while supplied gas lift flow rate at manifold 3 (M3) is represented in a fourth curve. As shown in the example of FIG. 10, once the gas lift rate reaches approximately 1, the oscillations in the pressure values are damped, such that their magnitudes are reduced and, within a period of time, the pressure values stabilize, noting a decrease as further increases in gas lift rate occur and a slight increase with high gas lift rates. At each increase, a small disturbance can be seen in pressure values, however, that damps out as pressure becomes relatively constant.

Figure 11:
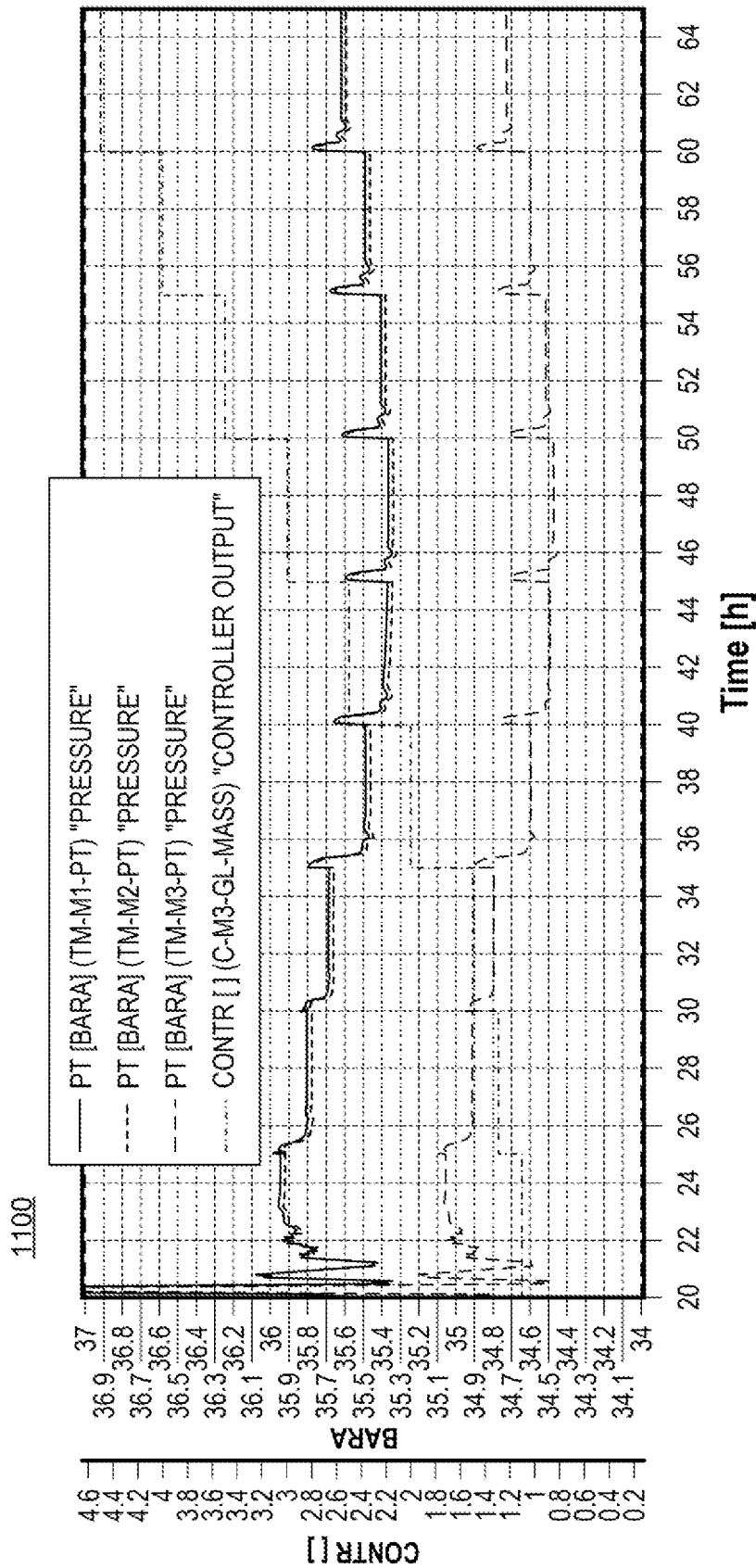
FIG. 11 illustrates an example of a graphical user interface.

FIG. 11 shows an example of a GUI 1100 with a plot for a period of time of 20 hours for wellhead pressure (downstream the wellhead chokes) as a function of supplied gas lift rate where a first curve is for pressure at manifold 1 (M1), a second curve is for pressure at manifold 2 (M2) and a third curve is for pressure at manifold 3 while supplied gas lift flow rate at manifold 3 (M3) is indicated in a fourth curve.

From the plots, gas lift rate to stabilize the instability is approximately 1.1 kg/s (e.g., as a mass flow rate) and the optimal gas lift rate (the gas lift rate that minimizes wellhead/manifold pressures) is around 3 kg/s.

As explained, a feedback controller can implement feedback control using a feedback control structure together with logic to activate one or more features of the feedback controller.

As an example, a feedback controller may not be set up to control pressure as it can be assumed that the minimum manifold pressure is unknown; rather, a feedback controller may be set up to minimize a logarithm of a standard deviation (variation) in pressure over a selected time period. While standard deviation is mentioned, as explained, one or more other types of metrics may be utilized that can suitably characterize pressure and/or flow, either or both of which may be utilized by a feedback controller (see, e.g., FIGS. 8 and 9); noting that temperature may be utilized additionally or alternatively (e.g., consider a PVT approach).

As an example, based on values in various plots, a slug flow period (e.g., cycle period) can be determined, which may be, for example, approximately 0.35 hour. In such an example, a feedback control scheme can select to minimize the logarithm of standard deviation of the one or more measured variables over a time period of approximately 0.5 hour.

As shown in various plots, manifold pressure at M3 may be selected as the controlled variable (e.g., variable to minimize the logarithm of standard deviation); noting that one or more other measured variables may be selected where a selected measured variable shows variation due to slug flow and becomes stable with increasing gas lift rate applies. As an example, one or more additive and/or multiplicative combinations of variables may be used. As to some example combinations consider one or more of sum of three manifold pressures; sum of wellhead pressures (downstream wellhead chokes); and sum of wellhead pressures (upstream wellhead chokes) multiplied with wellhead choke openings.

Written in mathematical form, a measurement can be:

$$m(t) = \sum_{i=1}^{n} \prod_{j=1}^{P(m_i)} u_j(t) std_T(m_i(t))$$

where $u_j(t) \geq 0, \forall t$ (positive for all $t$)

$$std_T(m_i(t)) = \sqrt{\frac{1}{T} \int_{t-T}^{t} (m_i(\tau) - avg_T(m_i(t)))^2 d\tau}$$

$$avg_T(m_i(t)) = \frac{1}{T} \int_{t-T}^{t} m_i(\tau) d\tau$$

As an example, an objective can be:

$$O(m(t)) = \min_{glr(t)} \log_{10} m(t)$$

where glr(t)—is the gas lift rate supplied

In various instances, it can be computational expensive to perform a numerical minimization. As an example, a feedback controller can drive an objective function to a minimum using feedback control.

As an example, with one measured variable $m_i(t)$, a feedback controller can drive an objective function to zero. In such an example, a feedback solution can utilize a setpoint at zero or close to zero (e.g., relative to the magnitude during slug flow); noting that, considering pressure and/or flow variation may be considerable when slug flow occurs (e.g., also consider possible temperature variation).

Figure 12:
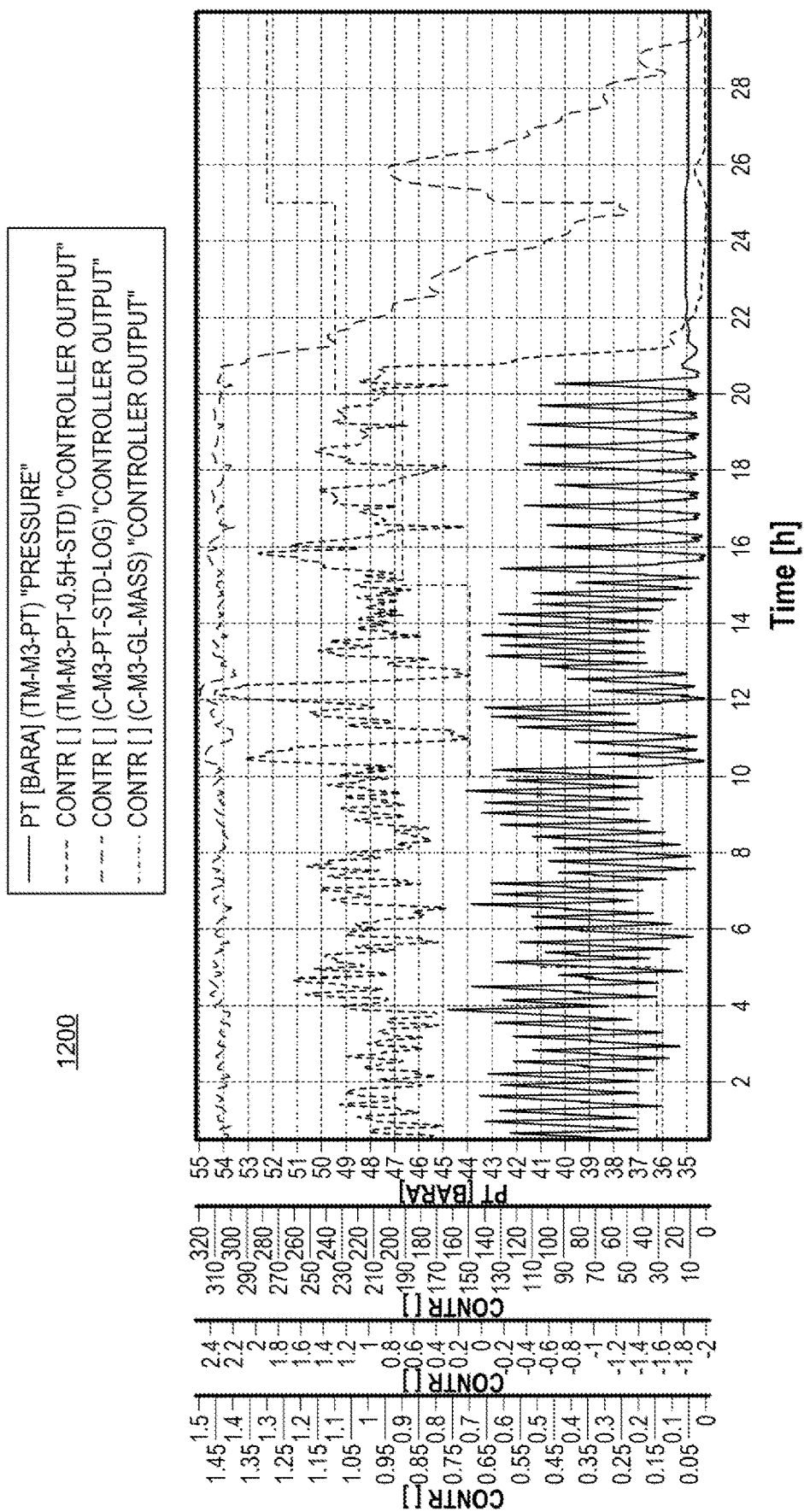
FIG. 12 illustrates an example of a graphical user interface.

FIG. 12 shows an example of a GUI 1200 that includes a plot of pressure at manifold 3 (M3), the 0.5 h standard deviation of manifold 3 (M3) pressure, the logarithm of the standard deviation and the supplied gas lift rate for the time period 0.5 h to 30 h. Specifically, the plot shows pressure at manifold 3 (M3), 0.5 h standard deviation of manifold 3 (M3) pressure, the 10-logarithm of the 0.5 h standard deviation and the supplied gas lift rate for the time period 0.5 h to 30 h.

In the GUI 1200 of FIG. 12, a distinct decrease in the standard deviation occurs as the production network becomes more stable. As shown, when the logarithm is less than 1, then the standard deviation is less than 10 kPa, and the system can be regarded as stable. Note that the increase (step change) in gas lift rate at time 25 h represents a disturbance to the stability due to the rapid increase in the gas lift flow rate. Also note that in the time-period from 10 to 20 h the slugs become larger (more severe) as the standard deviation increases in amplitude. However, the frequency becomes less. Hence, where gas lift rate is too low, the consequence is to make the slugging even more severe. Such data may be utilized to characterize a system, which, for example, may utilize a model. For example, consider a real-time model that can be tuned to approximate system behavior. In various examples, one or more types of models may be utilized, for example, in a tiered approach, a proxy approach, etc.

As an example, a control algorithm can take the logarithm of the 0.5 h standard deviation as a measured variable (e.g., a metric). In such an example, a controller can manipulate the gas lift rate to drive down the logarithm and the standard deviation (e.g., drive the metric to a minimal value, etc.).

Figure 13:
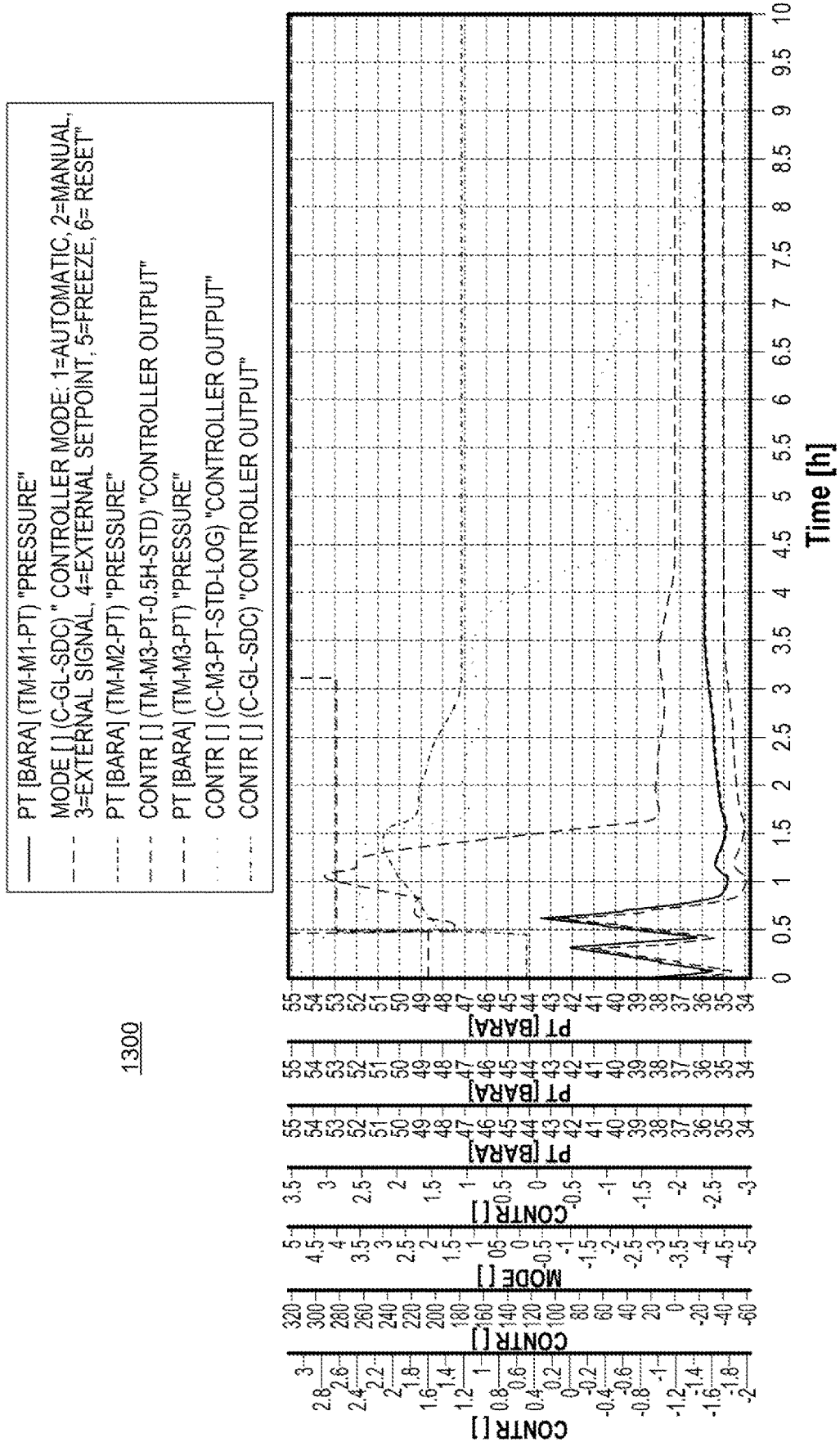
FIG. 13 illustrates an example of a graphical user interface.

FIG. 13 shows an example of a GUI 1300 with a plot that demonstrates how a feedback controller can perform using a single injection point at manifold 3 (M3) and with pressure at manifold 3 (M3) as single measured variable m(t). In the plot, the curves are for the manifold pressures while another curve is for the gas lift rate calculated by the feedback controller. In the plot, there is a curve for the controller mode, which can switch as appropriately between different modes (e.g., two or more modes). In the plot, one curve is for the 0.5 h standard deviation and another curve is for the logarithm of the 0.5 h standard deviation. As explained, the plot in the GUI 1300 shows wellhead pressure (downstream the wellhead chokes) as a function of supplied gas lift rate where a first curve is for pressure at manifold 1 (M1), a second curve is for pressure at manifold 2 (M2) and a third curve is for pressure at manifold 3 (M3) while the supplied gas lift flow rate at manifold 3 (M3) is represented in a fourth curve.

As an example, with reference to the GUI 1300, a feedback controller can be in a particular mode up to time 0.5 h. Prior to 0.5 h the gas injection rate is increased by increasing the setpoint. In such an example, the mode may be a manual mode where an operator increases the setpoint manually. At 0.5 h, the feedback controller can switch modes such as, for example, switched to a particular automatic mode (e.g., a level of automation). In the period from 0.5 h to 3.1 h the feedback controller can operate in that particular automatic mode and adjust the gas lift rate. As shown, slightly after time 3.1 h the feedback controller can determine that the system is sufficiently stable and in response stop updating the gas lift rate. In such an approach, the achieved gas lift rate is 1.08 kg/s (which is close to the 1.1 kg/s achieved when stepping up the gas lift rate). As shown, the corresponding standard deviation in the period prior to 3.1 h is around 10 kPa. As time goes on and the effect of the gas lift becomes effective, the standard deviation continuous to drop to less than one. As an example, if a disturbance arrives and instability occurs the feedback controller can automatically re-enter its particular automatic mode (e.g., or another suitable mode) and start to increase the gas lift rate, as may be appropriate.

As an example, if multiple gas injection points are available, then one or more of these may be used. As an example, an individual weighting can be determined from sensitivity of a measurement m(t) with respect to gas injection rate at point k. For example, by evaluating the sensitivities as follows $$\frac{dO(m(t))}{dglr_k(t)}$$

it is possible to obtain weights for the different gas injection points.

As an example, a system may utilize multiple gas injection points to improve controllability in a manner that reduces flow instability.

As explained, a metric such as standard deviation (square root of sum of squared derivations) can be utilized as a positive number that approaches zero when stability is achieved. Thus, the standard deviation of multiple measurements can be summed (e.g., a summation of positive values). As explained, standard deviation goes to zero as a system becomes stable. Again, the standard deviation is the square root of the sum of the squared deviations. The deviations can be computed from corresponding time averages. The time averages and standard deviations can be calculated over a time-period T (e.g., a time window, a time horizon, etc.). The implication of such an approach is adaptability (e.g., can be implemented in a manner where no nominal values are given). As explained, a feedback control scheme can be robust against model error and disturbances and can be computational efficient compared to optimization. As demonstrated, a feedback controller can stabilize flow in a system through control of gas lift rate at one or more points in the system where one or more measured variables (e.g., pressure, flow, temperature, etc.) can be utilized for feedback.

As explained, instabilities can occur in a multiphase fluid production system where such instabilities can give rise to control issues for controlling the multiphase fluid production system. As an example, a data-driven approach can be implemented to improve control where one or more metrics can be derived from field data. In such an example, a controller may operate without using a model as the one or more metrics can be sufficient to control the multiphase fluid production system to address an instability (e.g., by temporarily increasing gas flow rate, etc.); noting that one or more models may optionally be available additionally or alternatively. For example, a model may run in the background that can assess field data and control behavior. In such an example, where a data-driven, model-less approach results in undesirable control behavior, as may be detected through use of the model running in the background, the model, another model and/or a human may intervene to address such control behavior. For example, a model may identify a particular aspect of an instability and discern an underlying cause that may be controlled with or without an increase in gas flow and/or a model may provide a deviation metric that can trigger a notification to a device that prompts a human to intervene.

As an example, where complexity of a multiphase fluid production system increases, one or more models may be implemented that can account for availability of gas to one or more wells such that the available gas as may be optimally distributed to meet production goals is not adversely affected by increased gas flow that aims to address one or more instability issues at one or more wells, which may occur simultaneously, partially overlapping or close in sequence to one another. For example, a model may aim to maintain stable, controllable operation of a multiphase fluid production system in fluid communication with multiple wells that utilize gas lift.

As an example, a model can be a simulation model that can provide for assessments that may look backward in time and/or look forward in time. Such a model may be implemented in combination with feedback for one or more purposes. As an example, a data-driven approach can provide for some amount of looking forward. For example, one or more data-derived metrics may be indicative of a possibly upcoming instability such that a controller can take one or more control actions to reduce risk of the possibly upcoming instability actually occurring.

As an example, a real-time model can be utilized that receive real-time data, which may be in the form of one or more metrics. As an example, a real-time model can be tuned to a multiphase fluid production system or a portion thereof where the real-time model can make predictions based at least in part on received field data. In such an example, the real-time model can generate results for variables that may not necessarily be available from one or more sensors where such results may be utilized to determine one or more metrics for purposes of control to reduce risk of an instability and/or to overcome an instability. As an example, a real-time model may be utilized as a proxy model for one or more variables that may not be available on a temporary or a permanent basis. For example, consider failure of a sensor or a well where a particular sensor has not been installed. As explained, a real-time model may be adaptable or tunable to a particular multiphase fluid production system or a portion thereof where, for example, adaptation or tuning may occur before implementation and/or after implementation (e.g., to adjust to changes in circumstances such as flow rates, available gas, etc.). As an example, variables inferred from a real-time model may be utilized for computation of one or more metrics that may be in addition to one or more metrics derived from data without use of a model.

As an example, a minimum type of data may be specified for a controller. For example, consider a controller that requires data from at least one pressure sensor. In such an example, one or more metrics may be derived from data of a single pressure sensor associated with well (e.g., or wells) where the one or more metrics can be utilized for purposes of control to reduce risk of an instability and/or mitigate an instability. As an example, a pressure may be a wellhead pressure, a manifold pressure, a downhole pressure, or another pressure that can be affected by gas injection rate. While pressure is mentioned, a single type of measurement may be a flow measurement, a temperature measurement or another type of measurement that can be indicative of an instability (e.g., present or future). As an example, a pressure, volume and/or temperature (PVT) time of approach may be utilized, noting that a mass-based approach may be utilized additionally or alternatively to volume. As an example, a single measurement-based approach may utilize one of pressure, flow rate and temperature.

As an example, a framework can provide a tiered approach. For example, if a pressure measurement-based approach does not perform adequately, a model may be implemented as an escalation tier to provide one or more model-based outputs (e.g., one or more proxy values, etc.) that can be utilized to achieve adequate performance (e.g., instability detection and/or control). A tiered approach may make a framework more robust. As an example, a framework may utilize different time scopes such as, for example, past (e.g., data), present (e.g., real-time model) and future (e.g., predictive model). As an example, a metric may be applied within one or more time scopes. In such an example, the metric may be utilized in present and/or future control. As an example, a tiered approach may be implemented where it can detect and/or respond to one or more sensor issues. For example, if receipt of data from a sensor becomes unreliable or if the sensor or transmission channel fails, a change in tier may occur to address the issue (e.g., using a proxy model value, etc.).

As explained, control for gas lift may involve setpoint control where setpoint control may be interrupted for purposes of addressing instability issues (e.g., instability control) where, after addressing an instability issue, control may be returned to setpoint control.

As to a metric for use in control, it can be based on data over a period of time. As explained, a metric may be computed based on data over a period of time where, if stability exists, the metric tends to a null value (e.g., zero); whereas, if a possibility of instability or instability arises, the metric tends to a non-null value that may increase with increasing possibility and/or character of an instability. As an example, a metric may be formulated to be a positive value or a negative value with a null value of zero. As an example, a metric can be formulated such that its value increases considerably responsive to data indicative of instability where, for example, a controller can aim to drive the metric towards a value of zero (e.g., or other appropriate value).

As an example, a metric may be tailored to accuracy of one or more sensors. In such an example, the metric may provide one or more indications as to sensor performance. For example, the metric may exhibit some amount of jitter responsive to sensor jitter, which may be an indication of a sensor issue and/or a data transmission issue. As explained, a framework may response to a detected sensor issue by implementing one or more proxy models that may provide suitable values to continue control of instabilities without data from a problematic sensor.

As explained, a control response can involve call for ramping up a gas injection rate for one or more wells, followed by decreasing the gas injection rate. As to ramping up, it may occur on a reasonable time frame that takes into account equipment capabilities, flow values and/or characteristics, etc. For example, a too rapid ramping up may be destabilizing and/or exposing equipment to unnecessary wear; whereas, a too slow ramping up may allow for an instability to occur, increase in magnitude, propagate, etc.

As to determining a suitable setpoint, a framework may ramp up gas injection responsive to detection of an instability to squelch the instability followed by ramping down until another instance of instability occurs. In such an example, an upper value can be determined for squelching the instability and a lower value can be determined for where an instability may occur. Such values can be utilized as limits where a setpoint can be a value above the lower value (e.g., lower limit) that does not exceed the upper value (e.g., upper limit). As an example, the setpoint value may be determined as the lower value plus a fraction of the difference between upper and lower values. As explained, a framework may operate within a setpoint control approach where such a framework may adaptively utilize data and/or one or more models to adjust a setpoint, while also squelching instabilities or emerging risks thereof.

As explained, a goal may be to maintain the pressure in a multiphase fluid production system to be as low as possible, for example, to reduce gas utilization, etc. In various gas lift operation, a gas supply may be limited and may have to be optimized for delivery to assist with production from multiple wells. Gas lift optimization can be a process with multiple constraints. As an example, a framework for addressing instabilities can be part of or otherwise operatively coupled to a gas lift optimization framework. In such an example, gas expended for squelching instabilities may be budgeted, optionally using data, one or more models, etc. Over time, the budget may be adjusted, for example, from a more conservative value that reserves more gas for addressing instabilities to a less conservative value, which may provide for improved gas utilization and optimization. However, depending on actual performance, the reverse may be exhibited such that more gas is reserved for addressing instabilities. A framework that can address instability can temporarily increase gas utilization, however, it may reduce overall gas utilization by allowing for use of one or more lower setpoint values (e.g., a value that maintains stability a large percentage of the time). For example, a framework can operate to find a suitable setpoint that provides for adequate stability most of the time. In such an example, where the framework operates for multiple wells, such suitable setpoints can be utilized for purposes of gas optimization, for example, as lower value constraints as to gas injection rates for the multiple wells. In instances where a supply of gas may be insufficient for a number of wells, one or more wells may be shut-in or otherwise operated such that there is a sufficient amount of gas for operation at the lower values (e.g., lower limits) while also having some additional amount of gas available for control responsive to detection of a possible or actual instability. As an example, lower limits may be determined on a well-by-well basis where such lower limits may be utilized in a gas optimization framework to optimize gas lift for a number of the wells, which may be fewer than all wells, such that the number of wells can be controlled as to stability.

As an example, an instability can be an intermittent type of instability in multiphase flow. For example, consider intermittent gas in a liquid stream where pockets of gas can flow with liquid intermittently. As explained, an instability can be characterized as a slug flow instability. As an example, an intermittent type of instability may be a casing-heading instability. As explained, an instability can occur in one or more places within a multiphase fluid production system.

As explained, a framework can make use of measured data from the field directly to compute a metric for variation and taking a logarithm thereof to compute feedback for gas injection rate. In such an example, this can be an operational mode of the framework that is a direct feedback mode, which may operate without use of a model by relying on feedback solely on the measured data.

As mentioned, a model may be utilized such as, for example, the aforementioned OLGA model (e.g., OLGA simulator). As an example, a framework may implement an online approach that can make use of one or more different simulator modes in different time scopes. For example, a real time mode can aim to simulate a system in real time and provide computed variables that may or may not be directly measurable. A real time mode may make use of a subset of measurements, for example, to close model boundaries and estimate tuning parameters so that so that selected model variables match or minimize deviations to the corresponding measurements.

As an example, a framework may utilize one or more inferred variables from a real time model as part of an objective (e.g., as a measured variable). As an example, a real time model can dump snapshots regularly where a snapshot can be loaded into one or more additional simulator modes with a corresponding model of the system where such modes can include look-back and look-ahead.

As to a look-back mode, it can rerun a previous time period from a saved snapshot in the past and can stream logged data in the past up to a current time and perform one or more functions. In such an example, a function may provide for computation of a required gas injection rate that can aim to stabilize multiphase flow in a riser. In such an example, one or more variables computed by a look-back model may replace one or more measured variables.

As to a look-ahead mode, it can be run for a simulation using a dedicated look-ahead model, for example, from a most recent snapshot into a future time horizon. A look-ahead mode may be used to provide for early prediction of warnings as to possible instability, assuming measurements and inputs remain relatively the same (e.g., as in the most recent snapshot).

As an example, one or more functions may be implemented, which can provide, for example, computing of minimum gas injection rate(s) based on variables predicted by a look-ahead model. In such an example, the approach may be an indirect approach for computing one or more gas injection rates.

As an example, a look-back approach for computation of gas injection rates can include computing a revised gas injection rate that is based rerunning a preceding past time horizon (e.g., a past snapshot). As an example, a look-ahead approach for computation of gas injection rates can include computation of a revised gas injection rate that is based on the state that is current and a future time horizon, assuming variables remain relatively the same. Accordingly, as an example, a framework can provide for past, present and future determinations.

As to the past, it can involve a look-back up to a current state based on recalculated variables from a look-back model. As to present, it can involve using current measurements optionally with possible additional inferred variables from a real-time model. As explained, a direct approach can utilize current measurements without inferred variables; whereas, an indirect approach can additionally or alternatively utilize inferred variables from a real-time model; noting that an indirect approach for the present can utilize at least one current measurement. As to a future, it can involve predicting how a current state may evolve into the future (e.g., a future time horizon), which can be based on computation of a gas injection rate.

As an example, a framework may include features for implementing one or more techniques for determining minimum gas lift rates (e.g., gas injection rates). In such an example, consider determining one or more minimum gas lift rates based on: a past time horizon up to a current time; present data, which may also include one or more inferred variables form a real time model (e.g., variables that may or may not be directly measurable); and/or future predictions based on a current state and predictions into a future time horizon.

Figure 14:
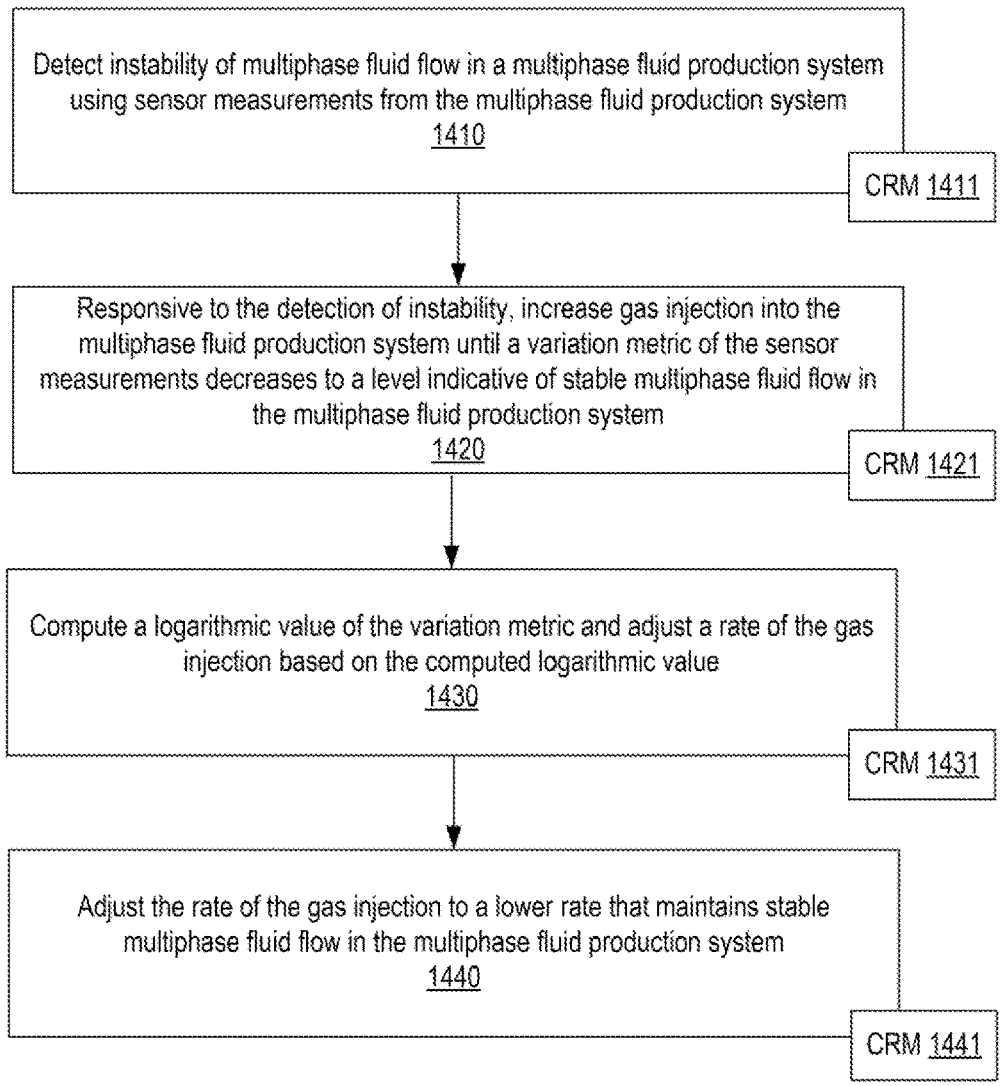
FIG. 14 illustrates an example of a method and an example of a system.

FIG. 14 shows an example of a method 1400 that includes a detection block 1410 for detecting instability of multiphase fluid flow in a multiphase fluid production system using sensor measurements from the multiphase fluid production system; and an increase block 1420 for, responsive to the detection of instability, increasing gas injection into the multiphase fluid production system until a variation metric of the sensor measurements decreases to a level indicative of stable multiphase fluid flow in the multiphase fluid production system (e.g., consider a threshold value that may be system dependent or otherwise set or determined). As shown, the method 1400 may also include a computation and adjustment block 1430 for computing a logarithmic value of the variation metric and adjusting a rate of the gas injection based on the computed logarithmic value; and an adjustment block 1440 for adjusting the rate of the gas injection to a lower rate that maintains stable multiphase fluid flow in the multiphase fluid production system.

As explained, a feedback controller can operate in various modes, which can include a mode responsive to detection of instability and a mode that tailors gas injection once the instability has been addressed. For example, consider the plot of the GUI 1300 of FIG. 13 where a mode of operation can utilize a logarithmic value of a variation metric to tailor gas injection (e.g., a gas lift rate or gas lift rates) to a lower value than that set by a prior mode of operation. As an example, a feedback controller may continually compute logarithmic values and, for example, adjust gas injection and/or switch modes responsive to such logarithmic values. As an example, a method can include setpoint control, for example, consider utilizing a variation metric and/or a logarithm thereof in a setpoint feedback control scheme.

In the example of FIG. 14, a system 1490 is shown that includes one or more information storage devices 1491, one or more computers 1492, one or more networks 1495 and instructions 1496. As to the one or more computers 1492, each computer may include one or more processors (e.g., or processing cores) 1493 and memory 1494 for storing the instructions 1496, for example, executable by at least one of the one or more processors. As an example, a computer may include one or more network interfaces (e.g., wired or wireless), one or more graphics cards, a display interface (e.g., wired or wireless), etc.

The method 1400 is shown along with various computer-readable media blocks 1411, 1424, 1431 and 1441 (e.g., CRM blocks). Such blocks may be utilized to perform one or more actions of the method 1400. For example, consider the system 1490 of FIG. 14 and the instructions 1496, which may include instructions of one or more of the CRM blocks 1411, 1421, 1431 and 1441. As an example, the system 1490 or a portion thereof may be a controller, a framework operatively coupled to a controller, etc. As an example, the method 1400 of FIG. 14 or a portion thereof may be implemented and/or use one or more application programming interfaces (APIs). As an example, one or more of a model API, a data API, a data storage API, an actuator API, etc., may be utilized. As an example, the method 1400 may be executable within the DELFI environment or operatively coupled to the DELFI environment. As an example, the method 1400 of FIG. 14 may be implemented on an edge computing device in the field that may be coupled to a network, at least for data acquisition and control.

As an example, a feedback controller may be implemented in the field as a local controller, which may, for example, be implemented using an edge computing device. In such an example, the edge computing device can receive sensor measurements and output control signals for controlling gas injection. As an example, such a device may be suitable for use in a system with one or more wells. Such a device can include a processor, memory, one or more interfaces and instructions that can be stored in the memory and executable by the processor. As an example, a device may be a feedback controller device that is for the purpose of gas injection adjustments to reduce multiphase flow instabilities in a multiphase fluid production system. As an example, a feedback controller scheme may be implemented in conjunction with one or more other types of controllers, which may, for example, be centralized using suitable computational equipment, which may include local and/or remote equipment (e.g., an edge device, a PLC device, cloud resources, etc.).

As an example, a method can include detecting instability of multiphase fluid flow in a multiphase fluid production system using sensor measurements from the multiphase fluid production system; and, responsive to the detection of instability, increasing gas injection into the multiphase fluid production system until a variation metric of the sensor measurements decreases to a level indicative of stable multiphase fluid flow in the multiphase fluid production system.

As an example, a variation metric can be standard deviation, variance or another suitable metric that characterizes variation. As an example, a variation metric may be a consistently positive value or a consistently negative value. For example, standard deviation is a consistently positive value as is variance (e.g., variance is the square of the standard deviation).

As an example, a variation metric can be computed for a time period. In such an example, the time period can be greater than a cycle period of a detected instability. As an example, a time period can be greater than 6 minutes and less than 240 minutes and may be less than 120 minutes or less than 60 minutes.

As an example, an instability can be a slug flow instability. As an example, multiphase fluid can include gas and oil or gas, water and oil.

As an example, sensor measurements can include pressure measurements, flow measurements, and/or temperature measurements. As an example, measurements can include upstream measurements that are upstream of an instability. For example, if slug flow is occurring in a riser, then measurements can include measurements that are upstream of the riser (e.g., at a manifold, a wellhead, etc.). As to control of a system to reduce instabilities, gas can be injected upstream of an instability, for example, at one or more points upstream of the instability. For example, if an instability occurs in a portion of a riser, gas injection can be at an upstream portion of the riser and/or at one or more points upstream of the riser (e.g., manifold, well, etc.).

As an example, a multiphase fluid production system can include at least one manifold in fluid communication with at least one well and/or at least one riser in fluid communication with at least one well. As an example, gas injection can occur at more than one point in a multiphase fluid production system. As an example, gas injection can occur at one or more of a well, a manifold and a riser. In the foregoing example, while a manifold is mentioned, a multiphase fluid production system may be a single well with gas injection from casing into tubing where, given that a single well is involved, a manifold may not be present or, for example, a manifold may be installed where the manifold has a single active conduit (e.g., one or more other conduits may be for future expansion, etc.).

As an example, method can include computing a logarithmic value of a variation metric and adjusting a rate of the gas injection based on the computed logarithmic value. In such an example, the adjusting can adjust the rate of the gas injection to a lower rate that maintains stable multiphase fluid flow in the multiphase fluid production system. As an example, a logarithmic value may be computed for a variation metric where if the variation metric is less than one the logarithmic value becomes negative. As an example, a logarithmic value may be utilized in a setpoint control scheme.

As an example, a system can include a processor; memory accessible by the processor; and processor-executable instructions stored in the memory where the instructions include instructions to instruct the system to: detect instability of multiphase fluid flow in a multiphase fluid production system using sensor measurements from the multiphase fluid production system; and responsive to the detection of instability, increase gas injection into the multiphase fluid production system until a variation metric of the sensor measurements decreases to a level indicative of stable multiphase fluid flow in the multiphase fluid production system.

As an example, one or more computer-readable storage media can include computer-executable instructions executable by a computer, the instructions including instructions to: detect instability of multiphase fluid flow in a multiphase fluid production system using sensor measurements from the multiphase fluid production system; and, responsive to the detection of instability, increase gas injection into the multiphase fluid production system until a variation metric of the sensor measurements decreases to a level indicative of stable multiphase fluid flow in the multiphase fluid production system.

Figure 15:
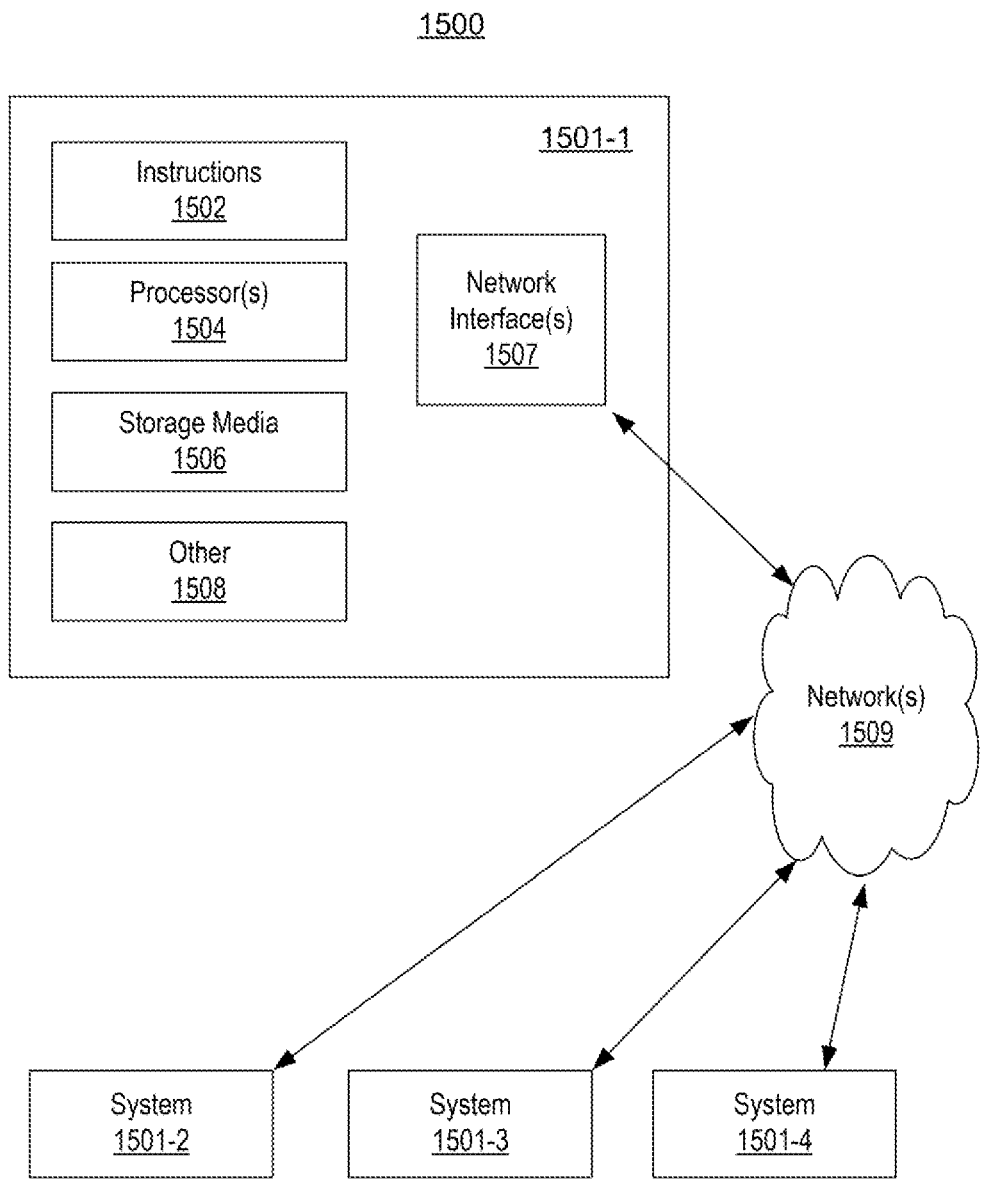
FIG. 15 illustrates an example of a computing system.

In some embodiments, the methods of the present disclosure may be executed by a computing system. FIG. 15 illustrates an example of such a computing system 1500, in accordance with some embodiments. The computing system 1500 may include a computer or computer system 1501-1, which may be an individual computer system 1501-1 or an arrangement of distributed computer systems such as systems 1501-2, 1501-3 and 1501-4. The computer system 1501-1 includes instructions 1502 that are configured to perform various tasks according to some embodiments, such as one or more methods disclosed herein. To perform these various tasks, the instructions 1502 can execute independently, or in coordination with, one or more processors 1504, which is (or are) connected to one or more storage media 1506 and optionally one or more other components 1508. The processor(s) 1504 is (or are) also connected to a network interface 1507 to allow the computer system 1501-1 to communicate over a data network 1509 with one or more additional computer systems and/or computing systems, such as 1501-2, 1501-3, and/or 1501-4 (note that computer systems 1501-2, 1501-3 and/or 1501-4 may or may not share the same architecture as computer system 1501-1, and may be located in different physical locations, e.g., computer systems 1501-1 and 1501-2 may be located in a processing facility, while in communication with one or more computer systems such as 1501-3 and/or 1501-4 that are located in one or more data centers, and/or located in varying countries on different continents).

A processor may include a microprocessor, microcontroller, processor module or subsystem, programmable integrated circuit, programmable gate array, or another control or computing device.

The storage media 1506 may be implemented as one or more computer-readable or machine-readable storage media. Note that while in the example embodiment of FIG. 15 storage media 1506 is depicted as within computer system 1501-1, in some embodiments, storage media 1506 may be distributed within and/or across multiple internal and/or external enclosures of computing system 1501-1 and/or additional computing systems. Storage media 1506 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed above may be provided on one computer-readable or machine-readable storage medium, or alternatively, may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

It may be appreciated that computing system 1500 is an example of a computing system, and that computing system 1500 may have more or fewer components than shown, may combine additional components not depicted in the example embodiment of FIG. 15, and/or computing system 1500 may have a different configuration or arrangement of the components depicted in FIG. 15. The various components shown in FIG. 15 may be implemented in hardware, software, or a combination of both hardware and software, including one or more signal processing and/or application specific integrated circuits.

Further, the steps in the processing methods described herein may be implemented by running one or more functional components in information processing apparatus such as general-purpose processors or application specific chips, such as ASICs, FPGAs, PLDs, or other appropriate devices. Such components, combinations of these components, and/or their combination with general hardware may be utilized as part of a system and/or to implement one or more methods.

Geologic interpretations, models, and/or other interpretation aids may be refined in an iterative fashion; this concept is applicable to the methods discussed herein. This may include use of feedback loops executed on an algorithmic basis, such as at a computing device (e.g., computing system 1500, FIG. 15), and/or through manual control by a user who may make determinations regarding whether a given step, action, template, model, or set of curves has become sufficiently accurate for the evaluation of the subsurface three-dimensional geologic formation under consideration.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

Figure 16:
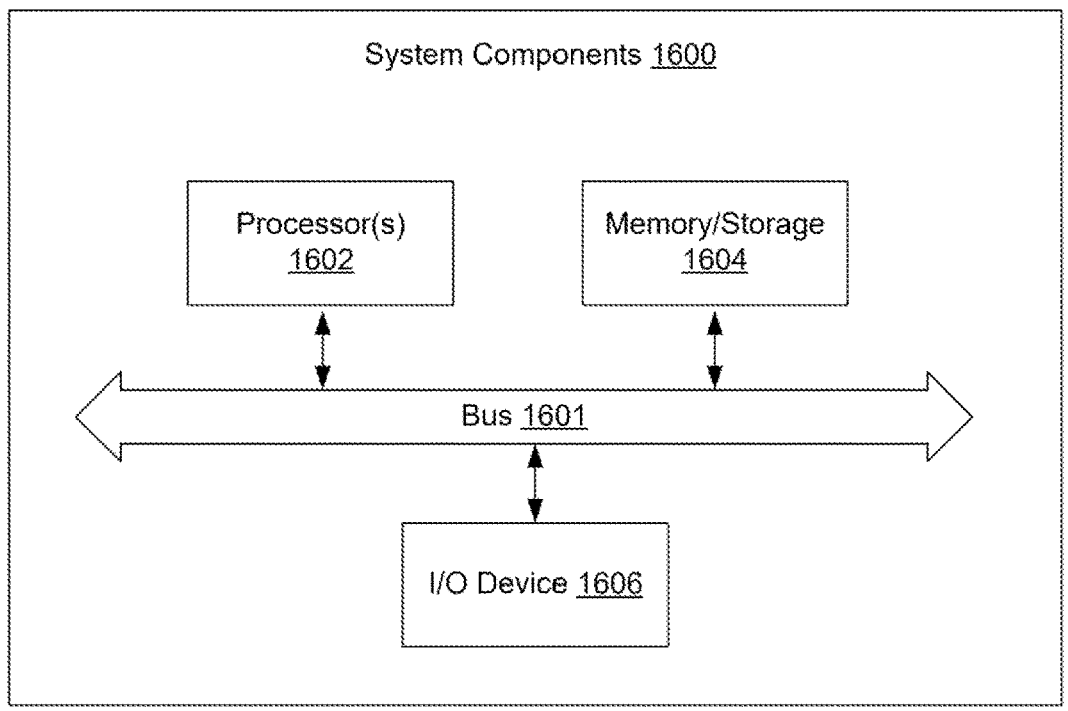
FIG. 16 illustrates example components of a system and a networked system.
Figure 16:
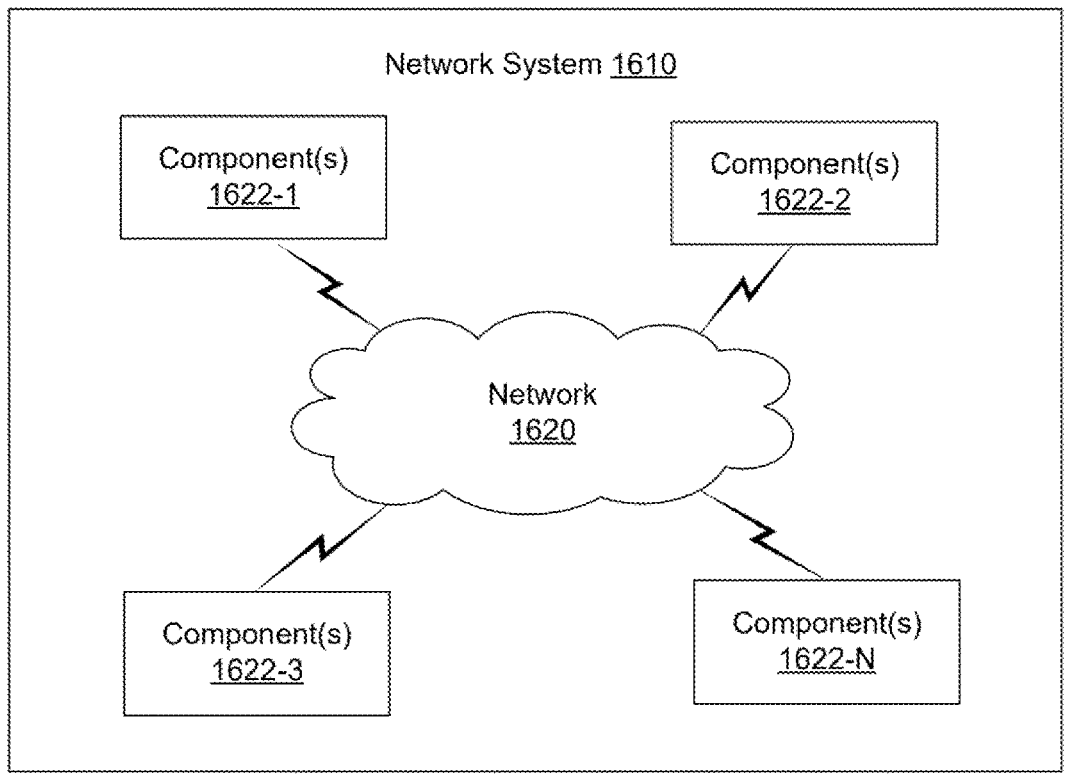

FIG. 16 shows components of an example of a computing system 1600 and an example of a networked system 1610. The system 1600 includes one or more processors 1602, memory and/or storage components 1604, one or more input and/or output devices 1606 and a bus 1608. In an example embodiment, instructions may be stored in one or more computer-readable media (e.g., memory/storage components 1604). Such instructions may be read by one or more processors (e.g., the processor(s) 1602) via a communication bus (e.g., the bus 1608), which may be wired or wireless. The one or more processors may execute such instructions to implement (wholly or in part) one or more attributes (e.g., as part of a method). A user may view output from and interact with a process via an I/O device (e.g., the device 1606). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1610. The network system 1610 includes components 1622-1, 1622-2, 1622-3, . . . 1622-N. For example, the components 1622-1 may include the processor(s) 1602 while the component(s) 1622-3 may include memory accessible by the processor(s) 1602. Further, the component(s) 1622 may include an I/O device for display and optionally interaction with a method. The network may be or include the Internet, an intranet, a cellular network, a satellite network, etc.

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
    injecting a gas into a multiphase fluid production system, wherein the multiphase fluid production system includes at least one mandrel, the at least one mandrel having a first bore and a second bore, the second bore having a longitudinal axis parallel to and spaced from a longitudinal axis of the first bore, wherein the gas is injected into the multiphase fluid production system via the second bore of the mandrel;
    detecting instability of multiphase fluid flow in the multiphase fluid production system using sensor measurements from the multiphase fluid production system; and
    responsive to the detection of instability, increasing the gas injection into the multiphase fluid production system until a variation metric of the sensor measurements decreases to a level indicative of stable multiphase fluid flow in the multiphase fluid production system,
    wherein the mandrel further comprises:
    one or more ports disposed through a sidewall of the mandrel in fluid communication with an annulus formed between the mandrel and an inner surface of a casing of the multiphase fluid production system; and
    a gas lift valve disposed in the second bore, the gas lift valve providing fluid communication between the annulus and the first bore of the mandrel via the one or more ports.

2. The method of claim 1, wherein the variation metric is standard deviation.

3. The method of claim 2, wherein the variation metric is variance, wherein the variance is the square of the standard deviation.

4. The method of claim 2, further comprising computing a logarithmic value of the standard deviation and adjusting a rate of the gas injection based on the computed logarithmic value.

5. The method of claim 4, wherein the adjusting adjusts the rate of the gas injection to a lower rate that maintains stable multiphase fluid flow in the multiphase fluid production system.

6. The method of claim 1, wherein the variation metric is computed for a time period.

7. The method of claim 6, wherein the time period is greater than a cycle period of the detected instability.

8. The method of claim 6, wherein the time period is greater than 6 minutes and less than 120 minutes.

9. The method of claim 1, wherein the instability is a slug flow instability.

10. The method of claim 1, wherein the multiphase fluid comprises gas and oil.

11. The method of claim 1, wherein the multiphase fluid comprises gas, water and oil.

12. The method of claim 1, wherein the sensor measurements comprise pressure measurements.

13. The method of claim 1, wherein the sensor measurements comprise flow measurements.

14. The method of claim 1, wherein the sensor measurements comprise one or more of pressure measurements, flow measurements or temperature measurements.

15. The method of claim 1, wherein the multiphase fluid production system comprises a plurality of mandrels.

16. The method of claim 1, wherein the multiphase fluid production system comprises at least one riser in fluid communication with at least one well.

17. The method of claim 1, wherein the gas injection occurs at more than one point in the multiphase fluid production system.

18. The method of claim 1, wherein the gas injection further occurs at a riser.

19. A system comprising:
    a processor;
    memory accessible by the processor; and
    processor-executable instructions stored in the memory wherein the instructions comprise instructions to instruct the system to:
    inject a gas into a multiphase fluid production system, wherein the multiphase fluid production system includes at least one mandrel, the at least one mandrel having a first bore and a second bore, the second bore having a longitudinal axis parallel to and spaced from a longitudinal axis of the first bore, wherein the gas is injected into the multiphase fluid production system via the second bore of the mandrel;
    detect instability of multiphase fluid flow in the multiphase fluid production system using sensor measurements from the multiphase fluid production system; and
    responsive to the detection of instability, increase the gas injection into the multiphase fluid production system until a variation metric of the sensor measurements decreases to a level indicative of stable multiphase fluid flow in the multiphase fluid production system,
    wherein the mandrel further comprises:
    one or more ports disposed through a sidewall of the mandrel in fluid communication with an annulus formed between the mandrel and an inner surface of a casing of the multiphase fluid production system; and
    a gas lift valve disposed in the second bore, the gas lift valve providing fluid communication between the annulus and the first bore of the mandrel via the one or more ports.

20. One or more computer-readable storage media comprising computer-executable instructions executable by a computer, the instructions comprising instructions to:
    inject a gas into a multiphase fluid production system, wherein the multiphase fluid production system includes at least one mandrel, the at least one mandrel having a first bore and a second bore, the second bore having a longitudinal axis parallel to and spaced from a longitudinal axis of the first bore, wherein the gas is injected into the multiphase fluid production system via the second bore of the mandrel;
    detect instability of multiphase fluid flow in the multiphase fluid production system using sensor measurements from the multiphase fluid production system; and responsive to the detection of instability, increase the gas injection into the multiphase fluid production system until a variation metric of the sensor measurements decreases to a level indicative of stable multiphase fluid flow in the multiphase fluid production system, wherein the mandrel further comprises:

one or more ports disposed through a sidewall of the mandrel in fluid communication with an annulus formed between the mandrel and an inner surface of a casing of the multiphase fluid production system; and a gas lift valve disposed in the second bore, the gas lift valve providing fluid communication between the annulus and the first bore of the mandrel via the one or more ports.

\* \* \* \* \*